United States Patent
Barbarossa

(10) Patent No.: US 6,867,868 B1
(45) Date of Patent: Mar. 15, 2005

(54) METHOD AND APPARATUS FOR TUNABLE INTERFEROMETER UTILIZING VARIABLE AIR DENSITY

(75) Inventor: Giovanni Barbarossa, Santa Clara, CA (US)

(73) Assignee: Avanex Corporation, Fremont, CA (US)

( * ) Notice: Subject to any disclaimer, the term of this patent is extended or adjusted under 35 U.S.C. 154(b) by 240 days.

(21) Appl. No.: 10/339,718

(22) Filed: Jan. 8, 2003

Related U.S. Application Data
(60) Provisional application No. 60/347,196, filed on Jan. 8, 2002.

(51) Int. Cl.⁷ .......................... G01B 9/02; G02B 27/00; G02B 27/10
(52) U.S. Cl. .................. 356/519; 359/578; 359/618
(58) Field of Search ................ 356/519, 73.1; 359/578, 618

(56) References Cited

U.S. PATENT DOCUMENTS

| | | | |
|---|---|---|---|
| 4,103,179 A | * 7/1978 | Schmidt | ...................... 359/327 |
| 6,130,971 A | 10/2000 | Cao | |
| 6,169,604 B1 | 1/2001 | Cao | |
| 6,310,690 B1 | 10/2001 | Cao et al. | |
| 6,396,629 B1 | 5/2002 | Cao | |
| 6,487,342 B1 | * 11/2002 | Wu et al. | ...................... 385/39 |
| 6,552,856 B1 | * 4/2003 | Chen | ........................... 359/634 |
| 6,621,632 B2 | * 9/2003 | Zhou | ........................... 359/577 |
| 6,809,865 B2 | * 10/2004 | Chen | ........................... 359/578 |

* cited by examiner

Primary Examiner—Gregory J. Toatley, Jr.
Assistant Examiner—Patrick Connolly
(74) Attorney, Agent, or Firm—Moser, Patterson & Sheridan, L.L.

(57) ABSTRACT

An air-density-tuned interferometer includes: a hermetically sealed enclosure; a front window coupled to the hermetically sealed enclosure; an interferometer residing within the hermetically sealed enclosure; and a pressure changing device coupled to the hermetically sealed enclosure. The interferometer within the enclosure includes: a first glass plate optically coupled to the front window; a first reflective coating coupled to the first glass plate; a second reflective coating optically coupled to the first reflective coating; a second glass plate coupled to the second reflective coating; and a plurality of spacers coupled to the first and second glass plates, forming an optical interometric cavity therein. The pressure changing device manipulates the gas pressure within the cavity. The air-density-tuned interferometer does not incorporate additional elements into the optical path within the interferometer and that does not disturb or move any of the optical components disposed within or associated with this optical path.

24 Claims, 19 Drawing Sheets

METHOD AND APPARATUS FOR TUNABLE INTERFEROMETER UTILIZING VARIABLE AIR DENSITY

CROSS REFERENCE TO RELATED APPLICATION

This application is claiming under 35 USC 119(e) the benefit of provisional patent application Ser. No. 60/347,196 filed on Jan. 8, 2002.

FIELD OF THE INVENTION

The present invention relates to optical switching, routing, filtering, dispersion compensating, multiplexing and de-multiplexing devices and methods. More particularly, the present invention relates to a tunable interferometer comprising parallel reflective surfaces whose tuning capability is utilized to perform the switching, routing, filtering, dispersion compensation, multiplexing and/or de-multiplexing.

BACKGROUND OF THE INVENTION

The use of optical fiber for long-distance transmission of voice and/or data is now common. As the demand for data carrying capacity continues to increase, there is a continuing need to utilize the bandwidth of existing fiber-optic cable more efficiently. An established method for increasing the carrying capacity of existing fiber cable is Wavelength Division Multiplexing (WDM). In this method, multiple information channels are independently transmitted over the same fiber using multiple wavelengths of light and each light-wave-propagated information channel corresponds to light within a specific wavelength range or "band."

In this specification, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

Because of the increased network traffic resulting from the use of the WDM technique, there is an increasing need for optical switching and routing devices that can quickly route or re-route numerous channels amongst various optical communications lines. An optical interferometer is a device that produces a periodic phase modulation in a composite optical signal. When an optical interferometer is incorporated as a component within another optical apparatus, this periodic phase modulation may be utilized advantageously to produce periodic transmission, reflection, optical delay or polarization properties within optical signals or composite optical signals passed through the apparatus. Moreover, if the optical interferometer is tunable, the peak positions of the modulated functions may be controllably varied so as to align the peak positions to standard channel positions to maximize optical throughput or so as to switch or route channels amongst various outputs.

Various mechanical, thermo-optic, electro-optic or magneto-optic methods have been employed to provide tuning capabilities to optical interferometers. Although these methods provide adequate tuning capabilities, they invariably add additional optical components and/or electronic connections to the interferometer, thereby increasing the complexity and difficulty of fabricating and aligning the interferometer and potentially reducing the stability and optical throughput of the interferometer. Accordingly, there remains a need for an improved tunable interferometer that does not incorporate additional elements into the optical path within the interferometer and that does not disturb or move any of the optical components disposed within or associated with this optical path. The present invention addresses such a need.

SUMMARY OF THE INVENTION

The present invention addresses the above stated needs through the disclosure of an air-density-tuned interferometer and optical switching, routing and multiplexing devices and methods utilizing the air-density-tuned interferometer. A first preferred embodiment of an air-density-tuned interferometer in accordance with the present invention comprises two transparent plates separated by at least one spacer and comprising respective partially-reflecting parallel surfaces such that an optical cavity is formed between the surfaces, wherein the plates and at least one spacer are contained within a sealed enclosure that incorporates a pressure-changing mechanism. A second preferred embodiment of an air-density-tuned interferometer in accordance with the present invention comprises a first transparent plate comprising a partially-reflecting surface, a second plate comprising a 100% reflecting surface parallel to the partially reflecting surface, at least one spacer separating the plates such that an optical cavity is formed between the surfaces, wherein the plates and the at least one spacer are contained within a sealed enclosure that incorporates a pressure changing mechanism. A third preferred embodiment of an air-density-tuned interferometer in accordance with the present invention comprises a first transparent plate comprising a partially-reflecting surface, a second plate comprising a 100% reflecting surface parallel to the partially reflecting surface, at least one spacer separating the plates such that an optical cavity is formed between the surfaces, an internal birefringent waveplate optically coupled between the partially reflective coating and the 100% reflective coating and an external birefringent waveplate optically coupled to the first transparent plate outside the optical cavity, wherein the plates, the at least one spacer and the birefringent waveplates are contained within a sealed enclosure that incorporates a pressure changing mechanism. The reflective surfaces may be formed from reflective or partially reflective coatings disposed on the plates.

The optical cavity between the parallel reflective or partially reflective surfaces comprises an "air" gap that is filled with air or another gas. The air or gas within the air gap communicates with air or gas outside of the optical cavity but within the enclosure through a hole, opening, slit, slot, etc. in or between the plates or the at least one spacer. The pressure changing mechanism causes changes in the density of air or gas so as to control the refractive index of air or gas within the optical cavity. The change in refractive index produces small precise changes in the optical path length within the optical cavity such that maxima and minima in periodic curves of transmission, reflection or polarization rotation are shifted by precisely controlled amounts. These shifts are utilized, within devices incorporating the air-density-tuned interferometer, to adjust the positions of the transmission, reflection or polarization rotation into correspondence with standard optical channel positions, to provide variable chromatic dispersion for optical channels or to switch or route channels.

DETAILED DESCRIPTION

The present invention provides an improved tunable interferometer apparatus as well as methods and apparatuses for utilizing the tunable interferometer within optical communications networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 6 in conjunction with the discussion below.

Figure 1:
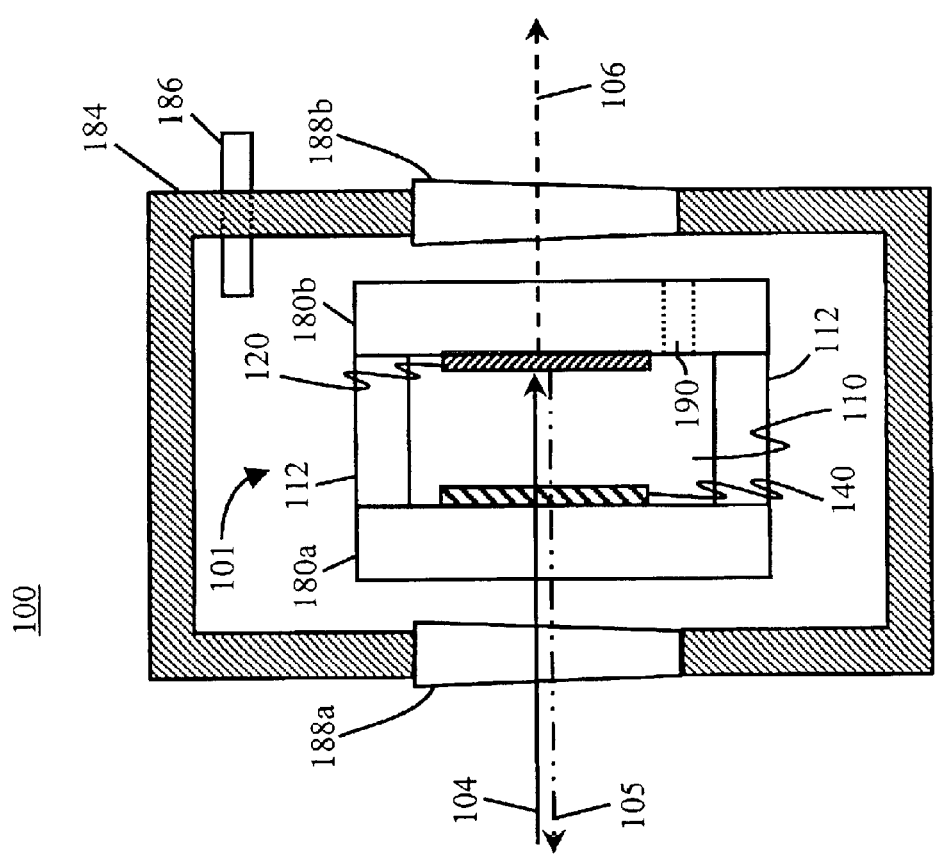
FIG. 1 is an illustration of a first preferred embodiment of an air-density-tuned interferometer in accordance with the present invention.

FIG. 1 is an illustration of a first preferred embodiment of an air-density-tuned interferometer in accordance with the present invention. The air-density-tuned interferometer 100 (FIG. 1) comprises a hermetically sealed enclosure 184 of substantially constant internal volume. The enclosure 184 carries a pressure changing device 186 and a first or front window 188a and a second or rear window 188b. The air-density-tuned interferometer 100 further comprises a Fabry-Perot interferometer 101 contained within the enclosure 184. The windows 188a–188b permit optical coupling to be maintained between the internal Fabry-Perot interferometer 101 and the external environment while maintaining a controlled air pressure within the enclosure 184.

The Fabry-Perot interferometer 101 comprising the air-density-tuned interferometer 100 comprises two glass plates 180a–180b optically coupled to one another so as to form an optical interferometric cavity 110 between the plates, wherein the inside face (that is, the face that faces into the cavity) of the first glass plate 180a is coated with a first partially reflective coating 140 and the inside face of the second glass plate 180b is coated with a second partially reflective coating 120 wherein the two coatings are substantially parallel to one another. The two glass plates 180a–180b are separated by a spacer or spacers 112, such that the interferometric cavity 110 between the first partially reflective coating 140 and the second partially reflective coating 120 maintains a constant width during any air-pressure changes. The spacers 112 preferably comprise a zero-thermal-expansion or low-thermal-expansion material.

Figure 5A:
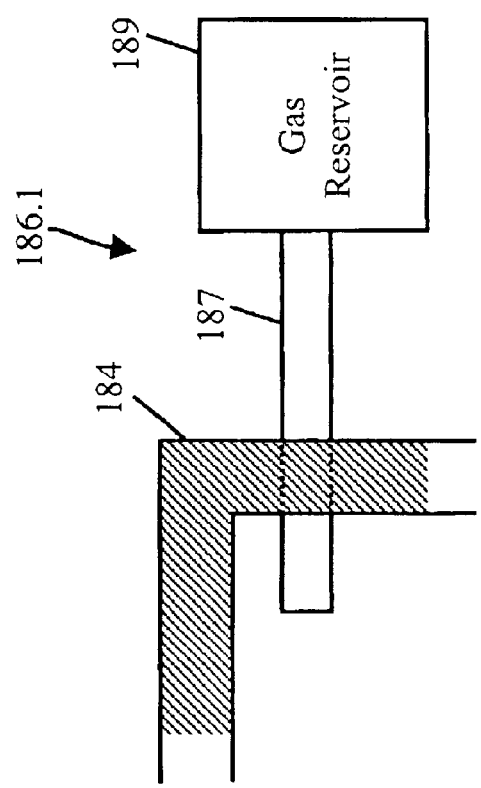
FIG. 5A is an illustration of a first pressure-changing device comprising an air-density-tuned interferometer in accordance with the present invention.
Figure 5B:
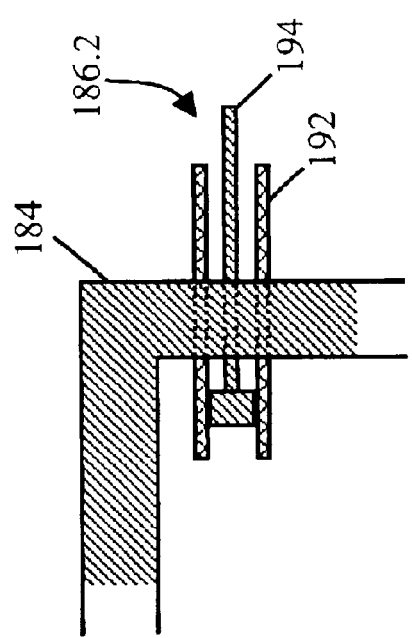
FIG. 5B is an illustration of a second pressure-changing device comprising an air-density-tuned interferometer in accordance with the present invention.
Figure 5C:
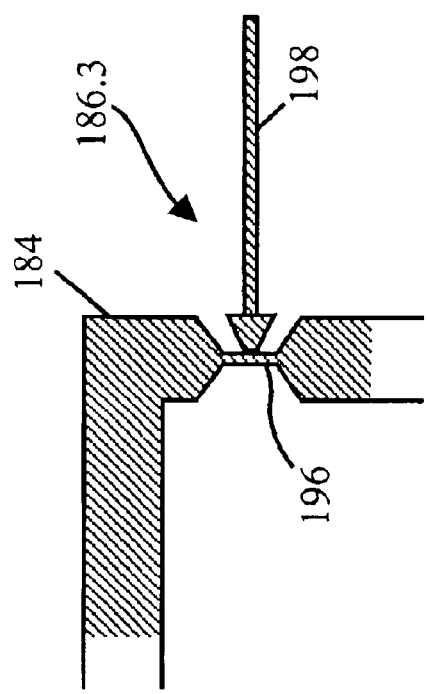
FIG. 5C is an illustration of a third pressure-changing device comprising an air-density-tuned non-linear interferometer in accordance with the present invention.

The exact pressure within the constant volume enclosure 184 may be varied and controlled by the pressure-changing device 186. Examples of preferred pressure-changing devices are illustrated in FIGS. 5A–5C and discussed in more detail below. The air pressure within the optical cavity 110 is equilibrated with that in the remainder of the enclosure 184 through an opening 190 which may be an orifice, crevice, slit or, simply, an open side. Since the internal volume of the enclosure 184 is maintained substantially constant, the controlled variations in gas pressure within the enclosure 184 cause corresponding changes in the density of air (or gas) within the enclosure 184. These density changes, in turn, cause changes in the refractive index of air or gas within the enclosure 184 and, in particular, within the optical cavity 110 between the reflective coatings 120 and 140.

Within the air-density-tuned interferometer 100, the first glass plate 180a is optically coupled to the front window 188a and the second glass plate 180b is optically coupled to the rear window 188b. These optical couplings permit an input composite optical signal 104 to enter into the Fabry-Perot interferometer 101 whilst permitting a reflected composite optical signal 105 and a transmitted composite optical signal 106 to exit the apparatus 100 via the front window 188a and rear window 188b, respectively.

The mechanism for and magnitude of the air density tuning of the interferometer 100 are now described. The following analysis is specific to a Fabry-Perot type interferometer but may be extended, in straightforward fashion, to other air-density-tuned interferometer apparatuses in accordance with the present invention. As is well-known, the transmission function, τ, of a Fabry-Perot interferometer is given by the following equation $$\tau = \frac{1}{1 + \left(\frac{4R}{1-R^2}\right)\sin^2\left(\frac{\varphi}{2}\right)} \quad \text{Eq. 1}$$

wherein R is the reflectivity of the mirrors and φ is the phase change of a light ray for one round-trip between the mirrors. Under the assumptions that there are no phase changes at the mirror surfaces and that the path of the light ray is perpendicular to the parallel mirror surfaces, then, the phase change φ is given by $$\varphi = \left(\frac{2\pi}{\lambda}\right)2\eta L = \left(\frac{4\pi\eta L}{c}\right)v \quad \text{Eq. 2}$$

wherein η is the refractive index of the material between the mirrors, λ is the wavelength of light in vacuum, L is the distance between the two mirrors, c is the speed of light in vacuum and v is the frequency of light in vacuum. By combining Eq. 1 and Eq. 2, it is clear that the transmission, τ, is periodic in frequency, with the period or, in other words, the Free Spectral Range (FSR), given by $$FSR = \frac{c}{2\eta L} \quad \text{Eq. 3}$$

It is further evident from Eq. 1 that, at a hypothetical null frequency, $v_0=0$, the corresponding transmission $\tau_0$ mathematically assumes its maximum value of unity, i.e., $\tau_0=1$, which is true for all values of L, R and η. Although the position of $v_0$ is fixed, the positions of other local maxima, i.e., "peaks", in the transmission curve can vary depending upon η and L. The first peak at finite frequency occurs at a frequency $v_1$=FSR=c/2ηL. The frequency position of this first peak shifts by a small amount as the refractive index η changes, with the rate of the frequency shift, $dv_1/d\eta$, of the first peak in the transmission curve given by $$\frac{dv_1}{d\eta} = \frac{d(FSR)}{d\eta} = \frac{-c}{2\eta^2 L} = \frac{-(FSR)}{\eta} \quad \text{Eq. 4}$$

The rate of shift of the $i^{th}$ transmission peak, $v_i$, is given by $$\frac{dv_i}{d\eta} = i\frac{d(FSR)}{d\eta} = \frac{-i(FSR)}{\eta} \approx \frac{-v_i}{\eta} \quad \text{Eq. 5}$$

wherein the final approximate equality results from the fact that i≈$v_i$/(FSR) since the change in FSR is negligible for small changes in refractive index. Finally, since the medium between the two mirror surfaces is assumed to be air with n≈1, $$\frac{dv_i}{v_i} \approx -d\eta \quad \text{Eq. 6}$$

Within the wavelength region utilized for fiber optic telecommunications-that is, from about 1500–1620 nm—an average value of $v_i$ in Eq. 6 may be taken as $v_i$=193.1 THz, which is a recommended anchor point for channel positions conforming to the International Telecommunications Union (ITU) grid. Also, the refractive index of air at 1 atm pressure within this wavelength range is virtually constant within a range 1.0002732–1.0002733. The quantity ($\eta_{air}-1$) is closely proportional to the density of air, pair, with a proportionality constant, h, given by h≈6.68 cm$^3$/mole. Written in differential form, this relationship becomes $d\eta_{air}$=h dρ. Then, under the reasonable assumption that the gas density is sufficiently low that ideal gas behavior is obeyed, both this proportionality constant as Eq. 6 may be inserted into the ideal gas law to derive the change in pressure, dP, corresponding to a given peak shift, $dv_i$. This is found to be $$dP = RT\, d\rho = \frac{RT}{h}d\eta_{air} = \sim \frac{RT}{h}\frac{dv_i}{v} \quad \text{Eq. 7}$$

wherein R is the ideal gas constant (for instance, R=82.0575 atm-cm$^3$-mole$^{-1}$-deg$^{-1}$) and T is absolute temperature in Kelvin, assumed to be constant at 298 K.

As an example of the use of the equations given above, it is useful to calculate the pressure change required for a peak shift equivalent to one-half channel spacing. In effect, this represents the maximum channel shift that is required in a practical sense as a result of the periodicity of τ. The ITU grid defines a common standard channel spacing of 100 GHz. It is therefore assumed, in this example, that the interferometer FSR matches this grid spacing, that is, FSR= 100 GHz. Therefore, a negative channel shift, $dv_i$, of −50 GHz is required to shift the peak maxima by one-half of the channel spacing. This −50 GHz shift requires an increase in refractive index of air given by $$d\eta_{air} \approx \frac{50\text{ GHz}}{193100\text{ GHz}} \approx 0.000259.$$

This corresponds to an approximate pressure change, in atmospheres, given by dP, wherein $$dP \approx \frac{82.0575 \times 298}{6.68} \times 0.000259 \approx 0.95 \text{ atm.}$$

This can be accomplished by changing the internal pressure from 1.00 atm to 1.95 atm such that the refractive index changes from 1.000273 to 1.000532. Finally, from Eq. 4, $$\frac{d(FSR)}{(FSR)} = -\frac{d\eta}{\eta} = \frac{-0.000259}{1.000273} \approx -0.000259.$$

Therefore, although the transmission peak maxima shift by a significant amount relative to the channel spacing, the relative decrease in FSR is much less than 1% and will not be observable in most practical applications.

Figure 2A:
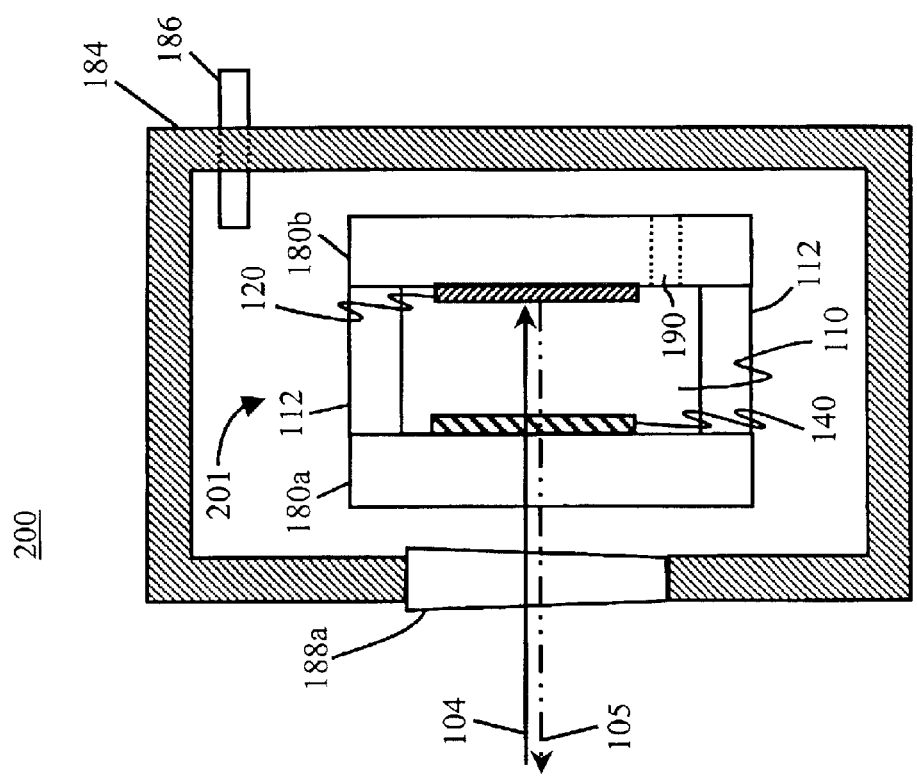
FIG. 2A is an illustration of a second preferred embodiment of an air-density-tuned interferometer in accordance with the present invention.

FIG. 2A is an illustration of a second preferred embodiment of a air-density-tuned interferometer in accordance with the present invention. The second air-density-tuned interferometer 200 (FIG. 2A) is similar to the first air-density-tuned interferometer 100 (FIG. 1) except that the second reflective coating 120 is a 100% reflective coating within the air-density-tuned interferometer 200. Accordingly, since there is no transmitted light beam through the second reflective coating 120, only a front window 188a is required and the interferometer contained within the enclosure 184 is a Gires-Tournois interferometer 201. The front window 188a permits an input composite optical signal 104 to enter the Gires-Tournois interferometer 201 and a reflected output composite optical signal 105 to exit the Gires-Tournois interferometer. Since the rear coating 120 reflects all the light input to the Gires-Tournois interferometer 201, there is no transmitted beam and all the wavelengths input to the interferometer 201 in composite optical signal 104 are reflected out of the interferometer 201 in the output composite optical signal 105. Instead of separating the paths of lights of various wavelengths, the Gires-Tournois interferometer 201 produces a periodic phase delay or phase shift, which is a function of wavelength, in the reflected composite optical signal 105.

Figure 2B:
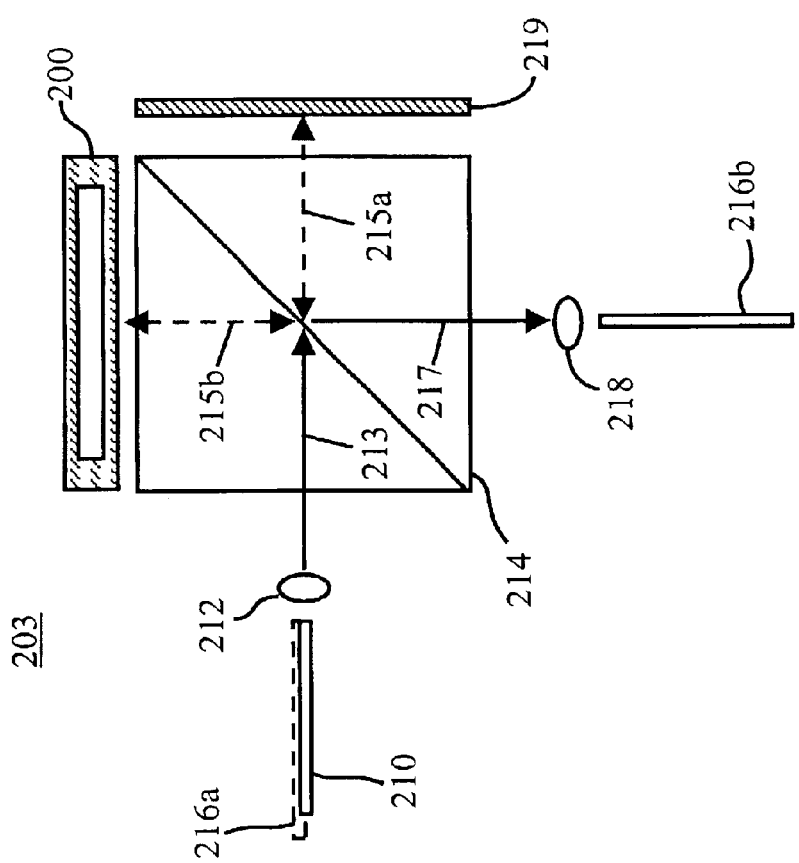
FIG. 2B is an illustration of a tunable multiplexer and de-multiplexer that utilizes an air-density-tuned interferometer in accordance with the present invention.

FIG. 2B is an illustration of a tunable multiplexer and de-multiplexer that utilizes an air-density-tuned Gires-Tournois interferometer similar to that illustrated in FIG. 2A. The tunable multiplexer and de-multiplexer 203 (FIG. 2B) comprises a beam splitter 214 that reflects 50% of an input light and transmits 50% of an input light optically coupled to a mirror 219 at a first side and to an air-density-tuned Gires-Tournois interferometer 200 at a second side. The tunable multiplexer and de-multiplexer 203 further comprises a first lens or lens assembly 212 optically coupled to the beam splitter 214 at a third one of its sides, a second lens or lens assembly 218 optically coupled to the beam splitter 214 at a fourth one of its sides, an input fiber 210 and a first output fiber 216a optically coupled to the first lens or lens assembly 212 and a second output fiber 216b optically coupled to the second lens or lens assembly 218. In the drawing of FIG. 2B, the first output fiber 216a is to be understood as being behind the input fiber 210. In an alternative embodiment, the first output fiber 216a may be eliminated and the one fiber 210 used bi-directionally for both input and output. In another alternative embodiment, the mirror 219 may be replaced by a second air-density-tuned Gires-Tournois interferometer.

The multiplexer and de-multiplexer 203 shown in FIG. 2B operates similarly to a Michelson interferometer. An input composite optical signal 213 is collimated by the first lens or lens assembly 212 and then directed into the beam splitter 214. The beam splitter 214 separates the composite optical signal 213 into a first portion 215a that is transmitted straight through the beam splitter 214 and a second portion 215b that is reflected at the beam splitter 214. The first portion 215a travels through the beam splitter 214 to the mirror 219 (or the air-density tuned interferometer 200) and is reflected therefrom back into the beam splitter 214. The second portion 215b travels from the beam splitter 214 to the air-density tuned interferometer 200 (or the mirror 219) and is reflected therefrom back into the beam splitter 214. The two portions 215a–215b recombine within the beam splitter 214 and are passed to the first 216a or the second 216b output fiber depending upon whether the returning lights of the two portions 215a–215b are in-phase or out-of-phase at the position at which they recombine.

The recombination of the two portions 215a–215b separates the lights according to wavelength since alternating bands of wavelengths are either in-phase or out-of-phase upon recombining within the beam splitter 214. Therefore, the apparatus 203 can operate as a de-multiplexer, or, alternatively, as a multiplexer if the light pathways are reversed. Further, the tuning of the air-density-tuned interferometer 200 controls the round trip phase delay incurred by the portion (either 215a or 215b) that is reflected by the interferometer 200 and therefore controls the routing of the wavelengths upon recombination of the two portions 215a–215b within the beam splitter 214. Therefore, the apparatus 203 can also operate as a switch. Those wavelengths that are in-phase upon recombination are focused by lens 212 into the first output fiber 216a whilst those wavelengths that are out of phase are focused by lens 218 into the second output fiber 216b.

Figure 2C:
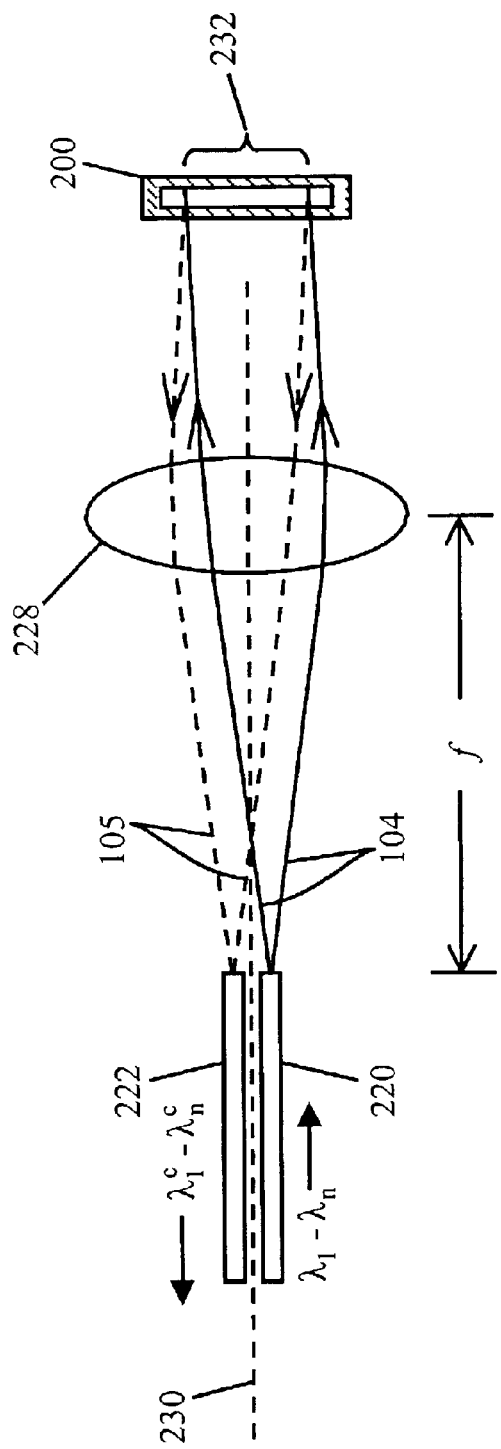
FIG. 2C is an illustration of a tunable chromatic dispersion compensator that utilizes an air-density-tuned interferometer in accordance with the present invention.

FIG. 2C is an illustration of a tunable chromatic dispersion compensator that utilizes an air-density-tuned interferometer in accordance with the present invention. The tunable chromatic dispersion compensator 205 shown in FIG. 2C is a modified version of an apparatus disclosed in U.S. Pat. No. 6,487,342, assigned to the assignee of the present application. Applicant incorporates this patent herein by reference in its entirety.

The tunable chromatic dispersion compensator 205 (FIG. 2C) comprises an input fiber 220, an output fiber 222 disposed adjacent to the input fiber 220, a lens or lens assembly 228 optically coupled to the fibers 220–222 and disposed substantially at its focal distance f from the end faces of the fibers 220–222 and an air-density-tuned interferometer 200 of the Gires-Tournois type (FIG. 2A) optically coupled to the lens 228. The air-density-tuned interferometer 200 is disposed at a side of the lens 228 opposite from the fibers 220–222 within the chromatic dispersion compensator 205. The two fibers 220–222 are equidistantly disposed about an axis 230 that is parallel to the long dimension of the fibers 220–222 and passes through the center of the lens 228 and the air-density-tuned Gires-Tournois interferometer 200.

In operation, a composite optical signal 104 that comprises undesired chromatic dispersion is delivered to the tunable chromatic dispersion compensator 205 from the input fiber 220, passes through the lens 228 and is collimated by this lens 228. The collimated composite optical signal then interacts with and reflects from the air-density-tuned Gires-Tournois interferometer 200 within a region 232. The air-density-tuned Gires-Tournois interferometer 200 adds a periodically oscillating chromatic dispersion to each channel of the composite optical signal. This added chromatic dispersion compensates for undesired chromatic dispersion in the composite optical signal 104 through algebraic cancellation. Stated differently, light wavelengths of each channel comprising undesired positive chromatic dispersion receive compensatory negative chromatic dispersion and vice versa. The reflected, dispersion compensated composite optical signal 105 then returns from the air-density-tuned Gires-Tournois interferometer 200 as a collimated beam that is focused by lens 228 into the output optical fiber 222. Alternatively, the output fiber 222 could be eliminated and the one fiber 220, disposed on the axis 230, could be used bi-directionally for both input and output.

Figure 2D:
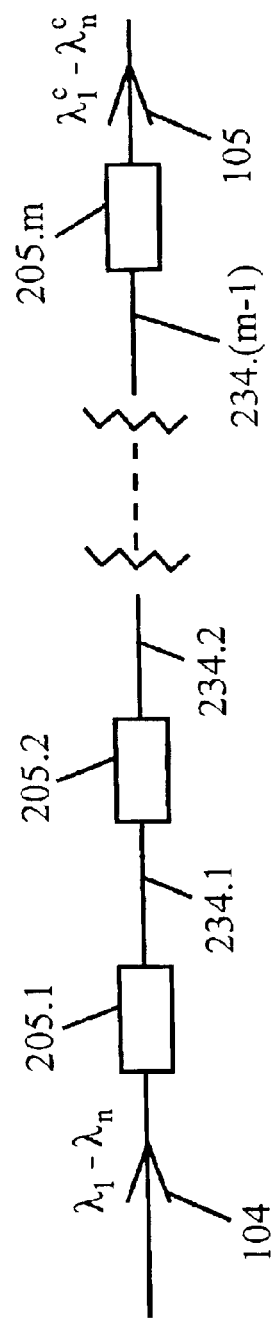
FIG. 2D is a schematic illustration of a tunable chromatic dispersion compensator system that utilizes air-density-tuned interferometers in accordance with the present invention.

FIG. 2D is a schematic illustration of a tunable chromatic dispersion compensator system that utilizes air-density-tuned interferometers in accordance with the present invention. The dispersion compensator system 206 shown in FIG. 2D is a modified version of a system disclosed in the aforementioned U.S. Pat. No. 6,487,342 as well as in a co-pending U.S. patent application assigned to the assignee of the present application entitled "Synthesis of Optical Dispersion Compensators and Methods Using a Series of Gires-Tournois Cavities," Ser. No. 09/750,933, filed on Dec. 29, 2000. Applicant incorporates this patent application herein by reference in its entirety. The tunable chromatic dispersion compensator system 206 (FIG. 2D) comprises a set of m multiple sequentially arranged tunable chromatic dispersion compensator devices 205.1–205.m, each utilizing an air-density tuned Gires-Tournois interferometer. The individual devices 205.1, 205.2, . . . , 205.m are optically coupled in sequence by the m−1 optical couplings 234.1–234.(m−1), each of which preferably comprises an optical fiber.

In the system 206 (FIG. 2D), the various air-density-tuned Gires-Tournois interferometers 200 within the sequence of individual tunable chromatic dispersion compensator devices 205.1,205.2, . . . , 205.m comprise various sets of operational parameters that may vary from one individual device to another. These operational parameters associated with a particular one of the individual devices 205.1, 205.2, . . . , 205.m comprise the reflectivity $r_1$ of the front mirror 188a of the interferometer 200 and the optical path length $L_0$ of the interferometer 200. Since $L_0=\eta L$, the optical path length is tunable by the air-density tuning previously described. The sequence of devices shown in FIG. 2D causes a summation of the chromatic dispersion provided by the various individual devices. Through this summation, the compensatory chromatic dispersion introduced by the system 206 may be made to conform to a particular desired form, as a function of wavelength.

In operation, a composite optical signal 104 that requires chromatic dispersion compensation and comprises the set of n channels $\lambda^c_1 - \lambda^c_n$ enters the first tunable chromatic dispersion compensator device 205.1 in the series of devices. The composite optical signal 104 is then directed to each one of the remaining individual devices 205.2–205.m in sequence by means of the optical couplings 234.1–234.(m−1). In each of the individual devices 205.1–205.m, partial compensatory chromatic dispersion is introduced into each of the channels $\lambda_1 - \lambda_n$ comprising the composite optical signal 104. Finally, the composite optical signal 105 comprising the chromatic dispersion compensated channels $\lambda^c_1 - \lambda^c_n$ exits the system 206 from the last device 205.m. The compensatory chromatic dispersion introduced into each of the channels comprises the algebraic sum of that introduced within each one of the individual devices 205.1–205.m. Since each individual device 205.1–205.m introduces a periodic chromatic dispersion curve into the composite optical signal and since the period and magnitude of the introduced chromatic dispersion may vary one such device to another in a controlled fashion, very complicated periodic dispersion may be generated by (and thus compensated by) the tunable chromatic dispersion compensator system 206.

Figure 3A:
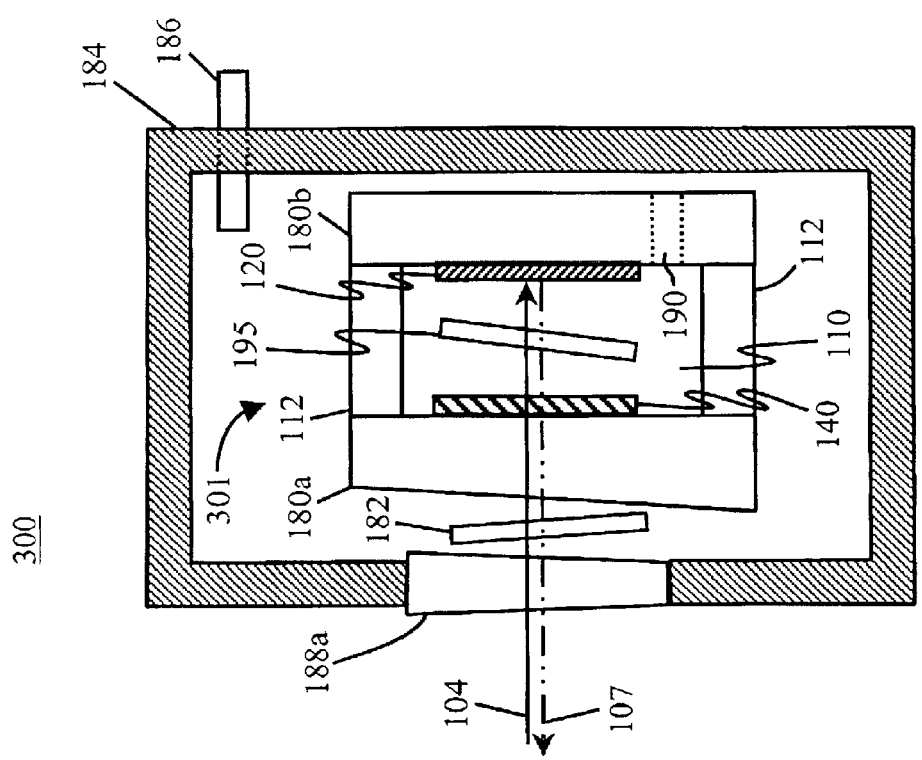
FIG. 3A is an illustration of a third preferred embodiment of an air-density-tuned interferometer in accordance with the present invention.

FIG. 3A is an illustration of a third preferred embodiment of an air-density-tuned interferometer in accordance with the present invention. The third air-density-tuned interferometer 300 (FIG. 3A) comprises all the same components as does the second air-density-tuned interferometer 200 (FIG. 2A). Further, the apparatus 300 comprises an internal birefringent waveplate 195 within the optical cavity 110 optically coupled between the partially reflective coating 140 and the 100% reflective coating 120 and an external birefringent waveplate 182 optically coupled to the front plate 180a outside the optical cavity 110. Therefore, the interferometer 301 contained within the enclosure 184 comprise a nonlinear interferometer of the type disclosed in U.S. Pat. No. 6,169,604 and in U.S. Pat. No. 6,310,690. Both of these patents, which are assigned to the assignee of the present application, are incorporated herein by reference in their entirety. The operation of such an interferometer is described in more detail in these referenced patents. In brief, however, an input linearly polarized light 104 comprised of multiple channels is reflected as light 107, wherein the polarization of a first set of channels comprising reflected light 107 is rotated and the polarization of a second set of channels comprising reflected light 107 and interleaved with the first set of channels is not rotated. The first and second sets of channels may comprise alternating "odd" and "even" channels as shown in FIG. 4B and discussed in reference to that figure or else may comprise sets of bands comprising non-equivalent band widths as shown in FIG. 4D and discussed in reference to that figure. The air-density tuning of the interferometer 301 shifts the wavelength bands comprising rotated polarization and non-rotated polarization to facilitate switching or channel grid alignment in the 2×2 tunable and switchable interleaved channel separator apparatuses described in the following.

Figure 3B:
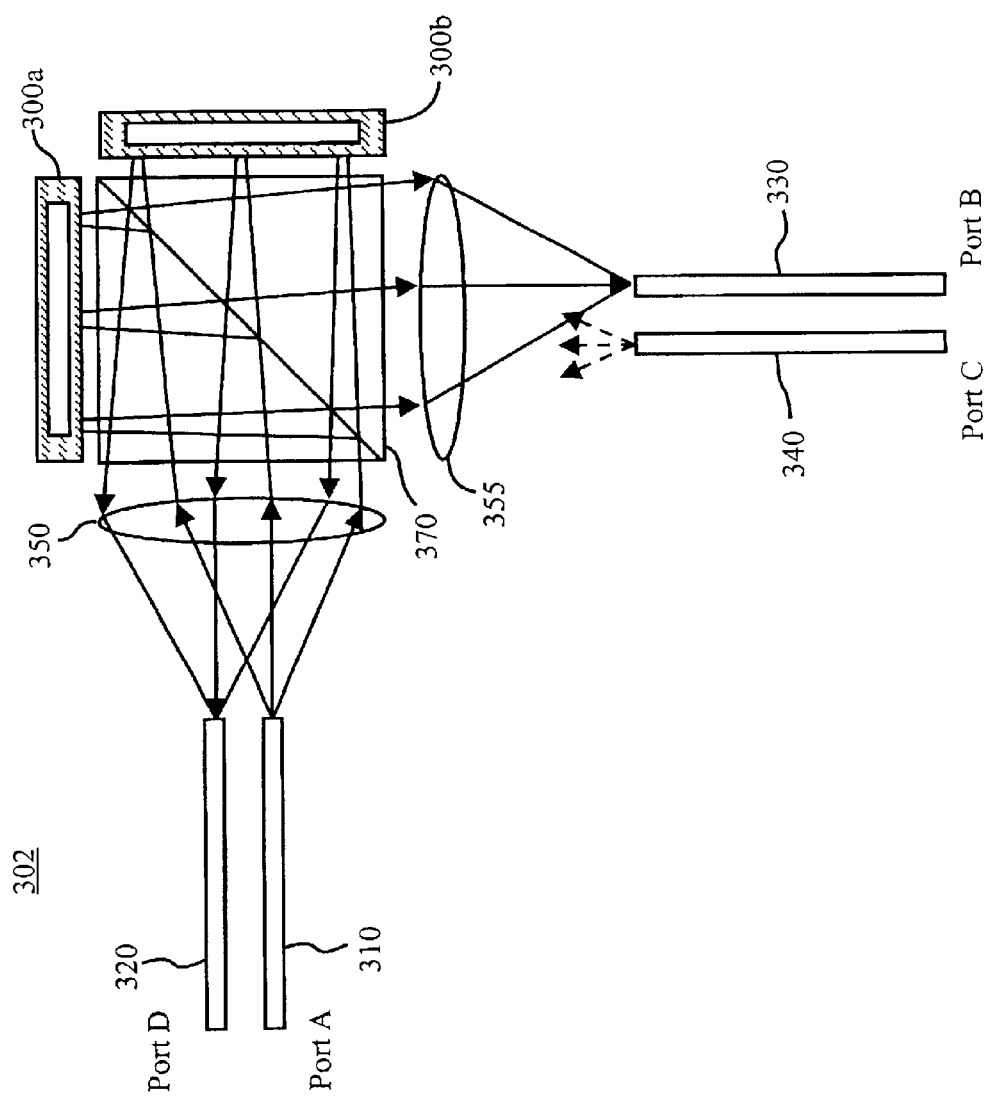
FIG. 3B is an illustration of a first 2×2 tunable and switchable interleaved channel separator apparatus that utilizes air-density-tuned interferometers in accordance with the present invention.

FIG. 3B is an illustration of a first 2×2 tunable and switchable interleaved channel separator apparatus that utilizes air-density-tuned interferometers 300a–300b in accordance with the present invention and as shown in FIG. 3A. The 2×2 tunable and switchable interleaved channel separator device 302, shown in FIG. 3B, is a modified version of an apparatus disclosed in U.S. Pat. No. 6,130,971, that is assigned to the assignee of the present application and which is incorporated herein by reference in its entirety. The 2×2 tunable and switchable interleaved channel separator device 302 (FIG. 3B) comprises a first input optical fiber 310 and a second input optical fiber 340 for inputting optical signals and first 320 and second 330 output optical fibers for outputting optical signals. As an input composite optical signal leaves the first input optical fiber 310, it diverges. A first lens 350 collimates the input composite optical signal and directs it toward a polarization beam splitter 370 which decomposes the composite optical signal into two sub-signals having mutually orthogonal polarizations. The s-polarized portion of the input composite optical signal polarized parallel to a plane in the polarization beam splitter 370 is reflected towards a first air-density-tuned non-linear interferometer 300a. The p-polarized portion of the signal polarized perpendicularly to the plane in the polarization beam splitter 370 passes through towards a second air-density-tuned non-linear interferometer 300b.

The set of channels comprising light whose polarization is rotated (the even channels, in this example) is directed to the second output optical fiber 330 and the light comprising the other set of channels ("odd channels") is directed to the first output optical fiber 320. When light is input from the second input optical fiber 340, the set of channels comprising light whose polarization is rotated is directed to the first output optical fiber 320 and the light comprising the other set of channels is directed to the second output optical fiber 330.

Each of the air-density-tuned non-linear interferometers 300a–300b comprising the 2×2 tunable and switchable interleaved channel separator device 302 may be tuned or varied by changing the density, and hence the refractive index, of air or gas within the interferometers. This tuning causes controlled variations or shifts of the wavelengths whose polarization plane is rotated and of the wavelengths whose polarization is not rotated. It is assumed that the two air-density-tuned non-linear interferometers 300a–300b are always both in the same state of tuning. Thus, for instance, by simultaneously tuning both of the air-density-tuned non-linear interferometers 300a–300b so as to cause shifts equivalent to one-half of their common FSR, the output pathways of odd and even channels may be reversed—and thereby switched—from those described above.

Figure 3C:
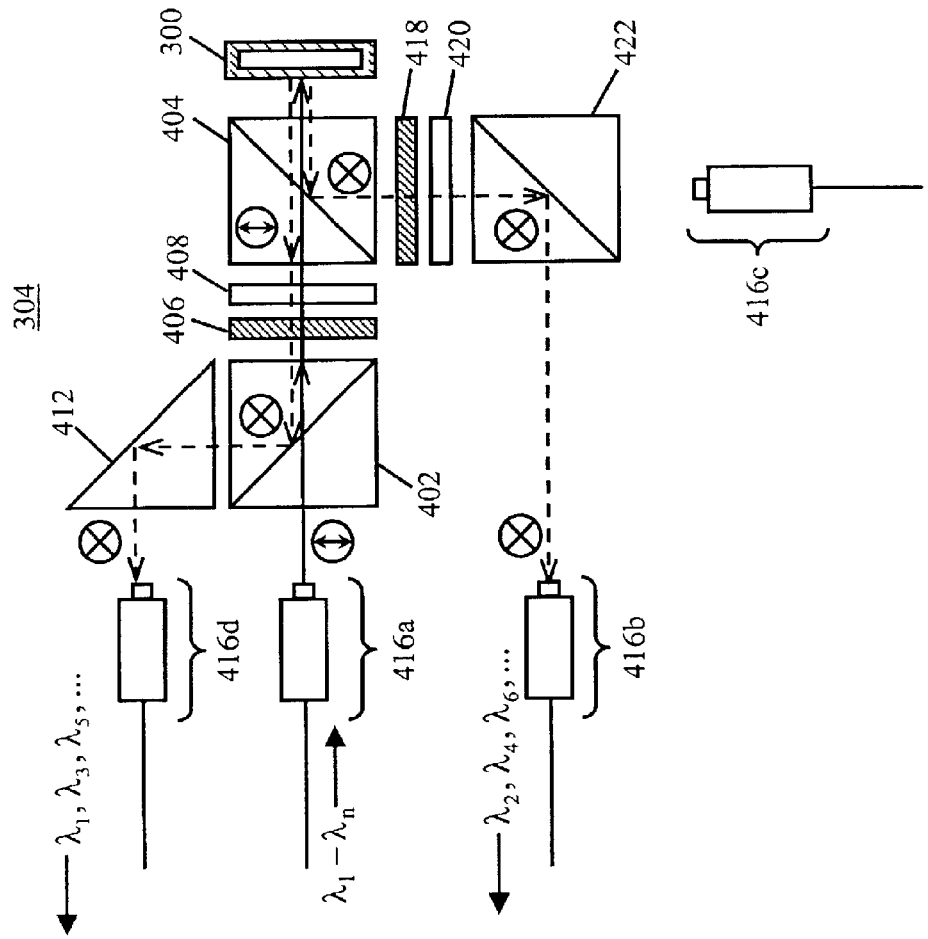
FIGS. 3C–3D are illustrations of a second 2×2 tunable and switchable interleaved channel separator apparatus that utilizes an air-density-tuned interferometer in accordance with the present invention illustrating the pathways of signal light rays therethrough.
Figure 3D:
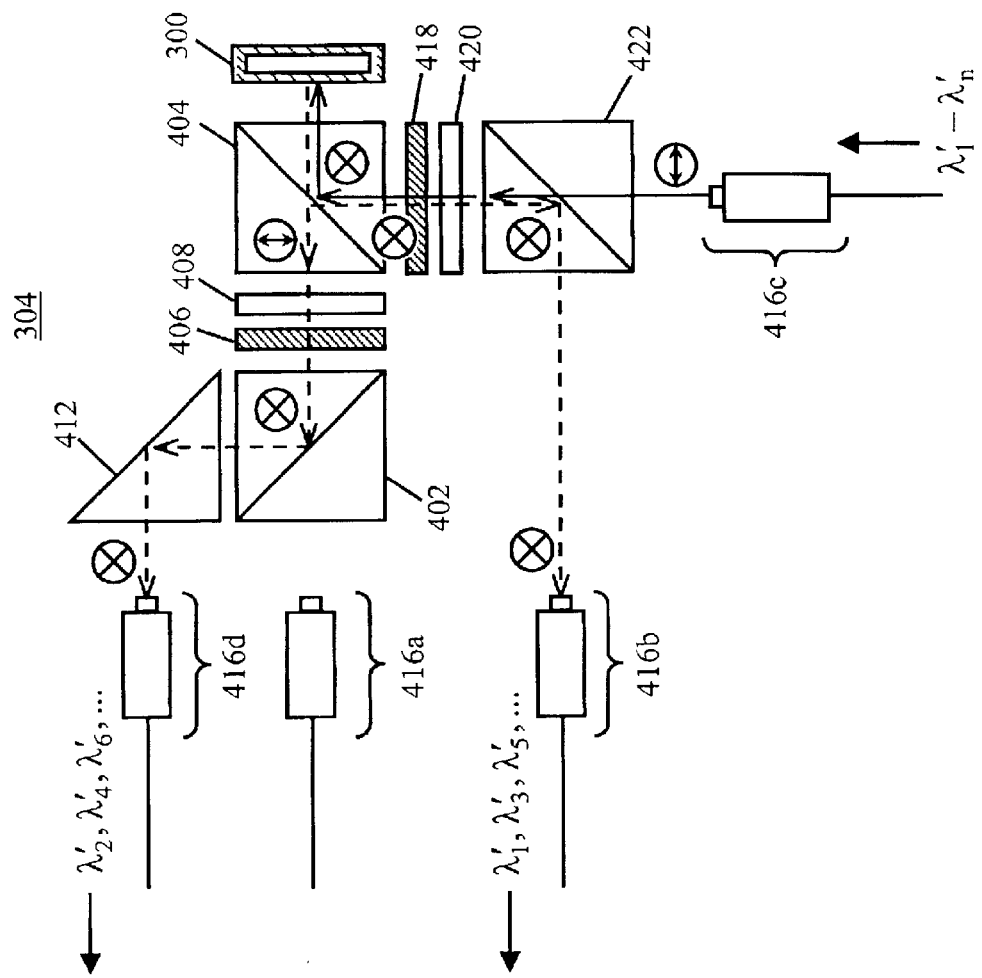

FIGS. 3C–3D are illustrations of a second 2×2 tunable and switchable interleaved channel separator apparatus that utilizes a single air-density-tuned interferometer in accordance with the present invention and as shown in FIG. 3A. The 2×2 tunable and switchable interleaved channel separator device 304, shown in FIGS. 3C–3D, is a modified version of an apparatus disclosed in a co-pending U.S. patent application assigned to the assignee of the present application entitled "Multi-Functional Optical Device Utilizing Multiple Polarization Beam Splitters and Non-Linear Interferometers," Ser. No. 09/630,891, filed on Aug. 2, 2000. Applicant incorporates this patent application herein by reference in its entirety.

The 2×2 tunable and switchable interleaved channel separator device 304 (FIGS. 3C–3D) receives input from a first input optical port 416a (FIG. 3C) and separates the channels therein into a first set of channels and a second set of channels, wherein the first and second sets are interleaved with one another or are defined by interleaved pass bands, wherein the first set is output to a second output optical port 416d and the second set is output to a first output optical port 416b. The 2×2 tunable and switchable interleaved channel separator device 304 further receives input from a second input optical port 416c (FIG. 3D) and separates the channels therein into a third set of channels and a fourth set of channels, wherein the third set comprises the same wavelengths as the first set and is output to the first output optical port 416b and wherein the fourth set comprises the same wavelengths as the second set and is output to the second output optical port 416d.

Figure 6:
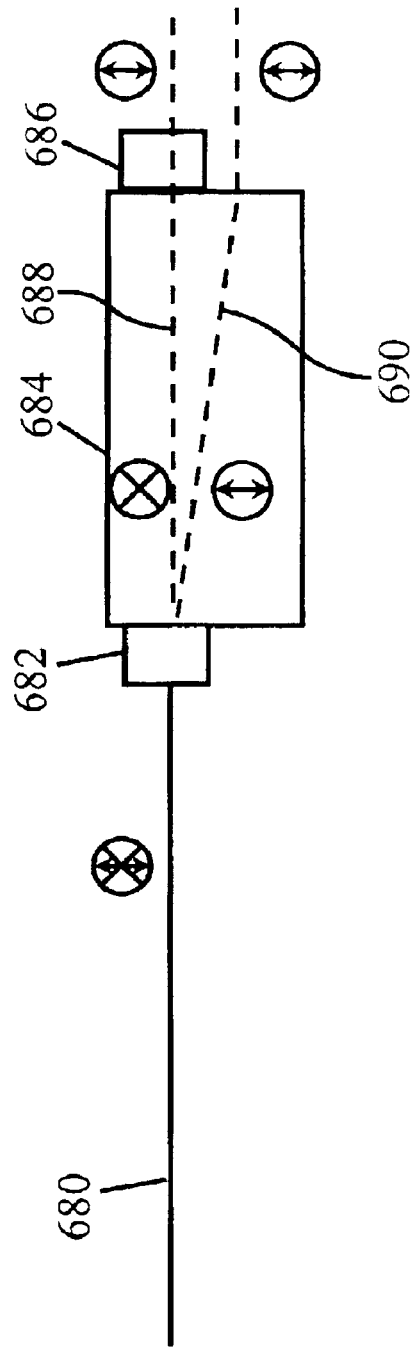
FIG. 6 is an illustration of a polarizing port as utilized within a tunable and switchable interleaved channel separator device.

All four ports 416a–416d comprising the apparatus 304 are polarizing ports of the type illustrated in FIG. 6. The polarizing port 416 (FIG. 6) comprises an optical fiber 680, an optical collimator 682, a birefringent walk-off plate 684 and a reciprocal optical rotator 686. The optical collimator 682 is optically coupled to the optical fiber 680 and either receives input from or directs output to the fiber 680. The birefringent walk-off plate 684 of the polarizing port 416 (FIG. 6) is optically coupled to the collimator 682 at a side opposite to the fiber 680 and has the property of physically separating an unpolarized light beam received from collimator 682 into a deflected light beam 690 and an un-deflected light beam 688. The deflected light 690 comprises an e-ray having a first linear polarization orientation and the un-deflected light 688 comprises an o-ray having a second linear polarization orientation perpendicular to that of the e-ray. The reciprocal optical rotator 686, which is optically coupled to the birefringent walk-off plate 684 at a side opposite to the collimator 682, is disposed so at to intercept the path of only one of the two beams 688–690. The reciprocal optical rotator 686 rotates the polarization orientation of said intercepted beam by 90° so as to be parallel to that of the other beam. In the reverse light propagation direction, that is, when the polarizing port 416 is utilized as an output port, the reciprocal optical rotator 686 rotates the polarization orientation of only one of two beams so that said beams subsequently comprise mutually orthogonal polarization orientations and such that these two beams are subsequently combined upon passage through the birefringent walk-off plate 684. The reciprocal optical rotator 686 may be disposed so as to intercept either the o-ray 688 or the e-ray 690 and preferably comprises a half-wave plate.

Referring once again to FIGS. 3C–3D, the 2×2 tunable and switchable interleaved channel separator device 304 further comprises a first 402 and a second 404 polarization beam splitter (PBS) between which are disposed a first non-reciprocal optical rotator 406 and a first reciprocal optical rotator 408. The first PBS 402 receives optical input from the input port 416a which is disposed adjacent to a side of the PBS 402 opposite to the first non-reciprocal optical rotator 406 and the first reciprocal optical rotator 408. An air-density-tuned non-linear interferometer 300 is disposed adjacent to the second PBS 404 at a side opposite to the first non-reciprocal optical rotator 406 and first reciprocal optical rotator 408. The input port 416a, first PBS 402, second PBS 404, first non-reciprocal optical rotator 406, first reciprocal optical rotator 408 and air-density-tuned non-linear interferometer 300 are disposed along a line which defines a main axis or dimension of the device 304.

The 2×2 tunable and switchable interleaved channel separator device 304 further comprises a third PBS 422 disposed off the main axis and optically coupled to port 416b and to port 416c and a second non-reciprocal optical rotator 418 and a second reciprocal optical rotator 420 disposed between the third PBS 422 and the second PBS 404. The 2×2 tunable and switchable interleaved channel separator device 304 may further comprise an optical reflector 412 disposed adjacent to a face of the first PBS 402 which does not intersect the main axis of the apparatus. The optical reflector 412 may comprise a right-angle prism, as shown, but could also comprise a mirror. If present, the optical reflector 412 is optically coupled between the first PBS 402 and port 416d. If the optical reflector is not present, then the port 416d is directly optically coupled to the PBS 402. Another optical reflector could likewise be optically coupled between the third PBS 422 and the port 416c.

The first non-reciprocal optical rotator 406 and the second non-reciprocal optical rotator 418 within the 2×2 tunable and switchable interleaved channel separator 304 preferably are Faraday rotators. The first reciprocal optical rotator 408 and the second reciprocal optical rotator 420 are preferably half-wave plates. The first pair of optical rotators 406–408 has the property such that linearly polarized light passing completely therethrough from left to right does not incur polarization plane rotation whilst linearly polarized light passing completely therethrough from right to left does incur a 90° rotation of its polarization plane. Likewise, the second pair of optical rotators 418–420 has the property such that linearly polarized light passing completely therethrough from top to bottom does not incur polarization plane rotation whilst linearly polarized light passing completely therethrough from bottom to top does incur a 90° rotation of its polarization plane. The reciprocal and the non-reciprocal optical rotator comprising each such pair need not be disposed in the order shown. One of ordinary skill in the art will know how to configure a reciprocal and a non-reciprocal optical rotator so as to have the properties noted above.

The three PBS's 402, 404 and 422 comprising the 2×2 tunable and switchable interleaved channel separator device 304 each have the property of transmitting signal light comprising a first polarization (p-polarization) therethrough whilst simultaneously deflecting or reflecting signal light comprising a second polarization (s-polarization). The air-density-tuned non-linear interferometer 300 operates similarly to the air-density-tuned non-linear interferometers 300a–300b utilized in the 2×2 tunable and switchable interleaved channel separator 302 (FIG. 3B) and causes polarization rotation of linearly polarized light of the second set of channels and the fourth set of channels upon reflection therefrom while leaving the polarization orientation of linearly polarized light of the first and third sets of channels unchanged.

Further shown in FIGS. 3C–3D), as well as in several following figures of this document, are the polarization orientations of various signal light rays. These polarization orientations are indicated by double barbed arrows and/or crosses inscribed within circles. Unless otherwise indicated, double barbed arrows indicate light polarization along the indicated direction within the plane of the illustration, and crosses indicate light polarization normal to the plane of the page. Superimposed arrows and crosses either indicate unpolarized or randomly polarized light or superimposed rays which, in projection, have mutually perpendicular polarization plane orientations. These polarization-indicating symbols are included for the convenience of the reader and are not to be construed as components of the invention. Each light pathway illustrated in FIGS. 3C–3D actually comprises two beams, both with the same linear polarization orientation, as shown in FIG. 6. These two beams are offset from one another along a direction perpendicular to the plane of the drawing and therefore cannot be shown separately within FIGS. 3C–3D.

Details of the operation of the 2×2 tunable and switchable interleaved channel separator device 304 are provided in the aforementioned co-pending U.S. patent application with Ser. No. 09/630,891. FIG. 3C illustrates the pathways of an input composite optical signal comprising the channels $\lambda_1$–$\lambda_n$ from the first input port 416a to the interferometer 300, of a first set of channels (e.g. "odd" channels $\lambda_1$, $\lambda_3$, $\lambda_5$ . . . ) from the interferometer 300 to the second output port 416d and of a second set of channels (e.g. "even" channels $\lambda_2$, $\lambda_4$, $\lambda_6$ . . . ) from the interferometer 300 to the first output port 416b. FIG. 3D illustrates the pathway of a second composite optical signal comprising the channels $\lambda'_1$–$\lambda'_n$ from the second input port 416c to the interferometer 300, of a third set of channels (e.g. "odd" channels $\lambda'_1$, $\lambda'_3$, $\lambda'_5$ . . . ) from the interferometer 300 to the first output port 416b and a fourth set of channels (e.g. "even" channels $\lambda'_2$, $\lambda'_4$, $\lambda'_6$ . . . ) from the interferometer to the second output port 416d. These pathways may be verified by noting the polarization states the signal lights at various points along the pathways and by taking account of the operation of the PBS's, the operation of the pairs of optical rotators, the operation of the air-density-tuned non-linear interferometer and the operation of the polarizing ports.

Figure 3E:
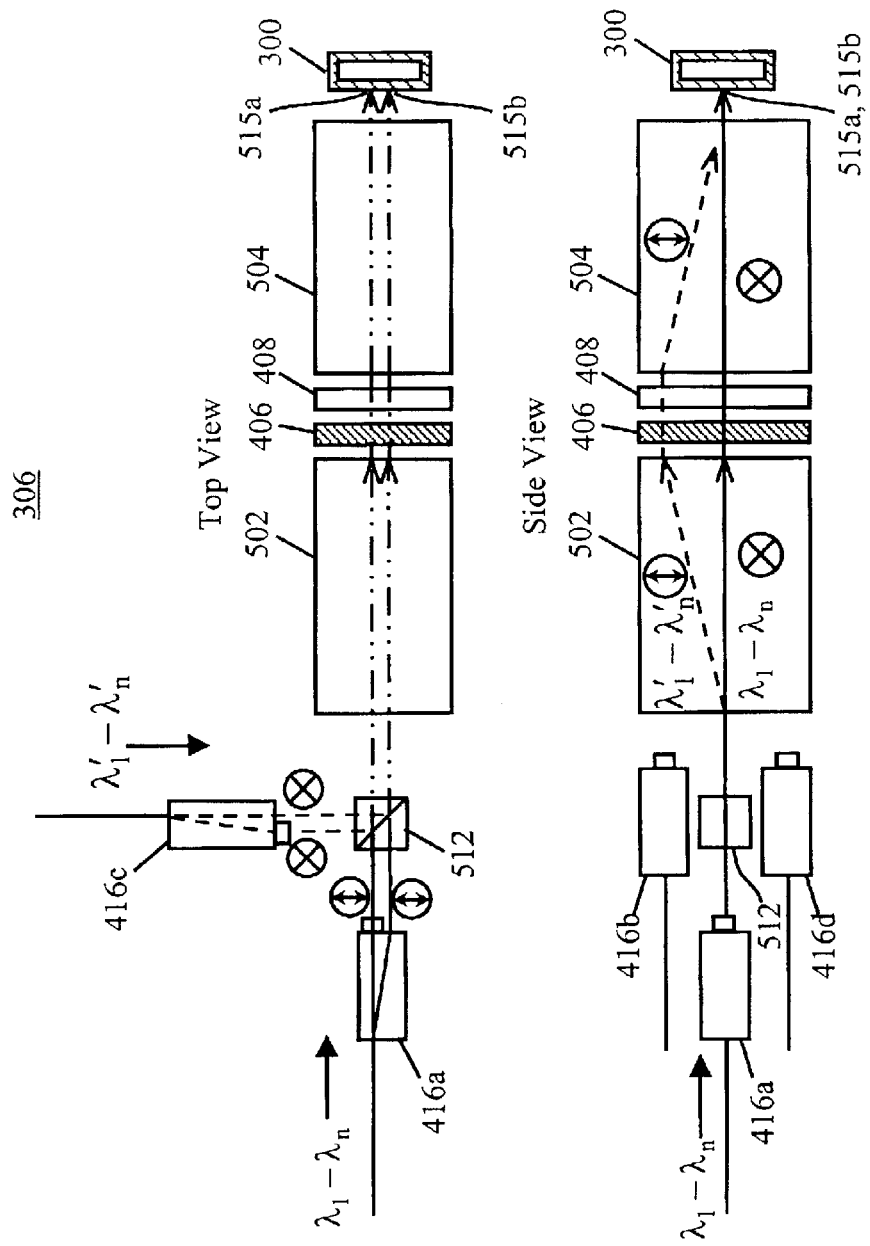
FIGS. 3E–3F are each a top view and a side view of a third 2×2 tunable and switchable interleaved channel separator apparatus that utilizes an air-density-tuned interferometer in accordance with the present invention illustrating the pathways of signal light rays therethrough.
Figure 3F:
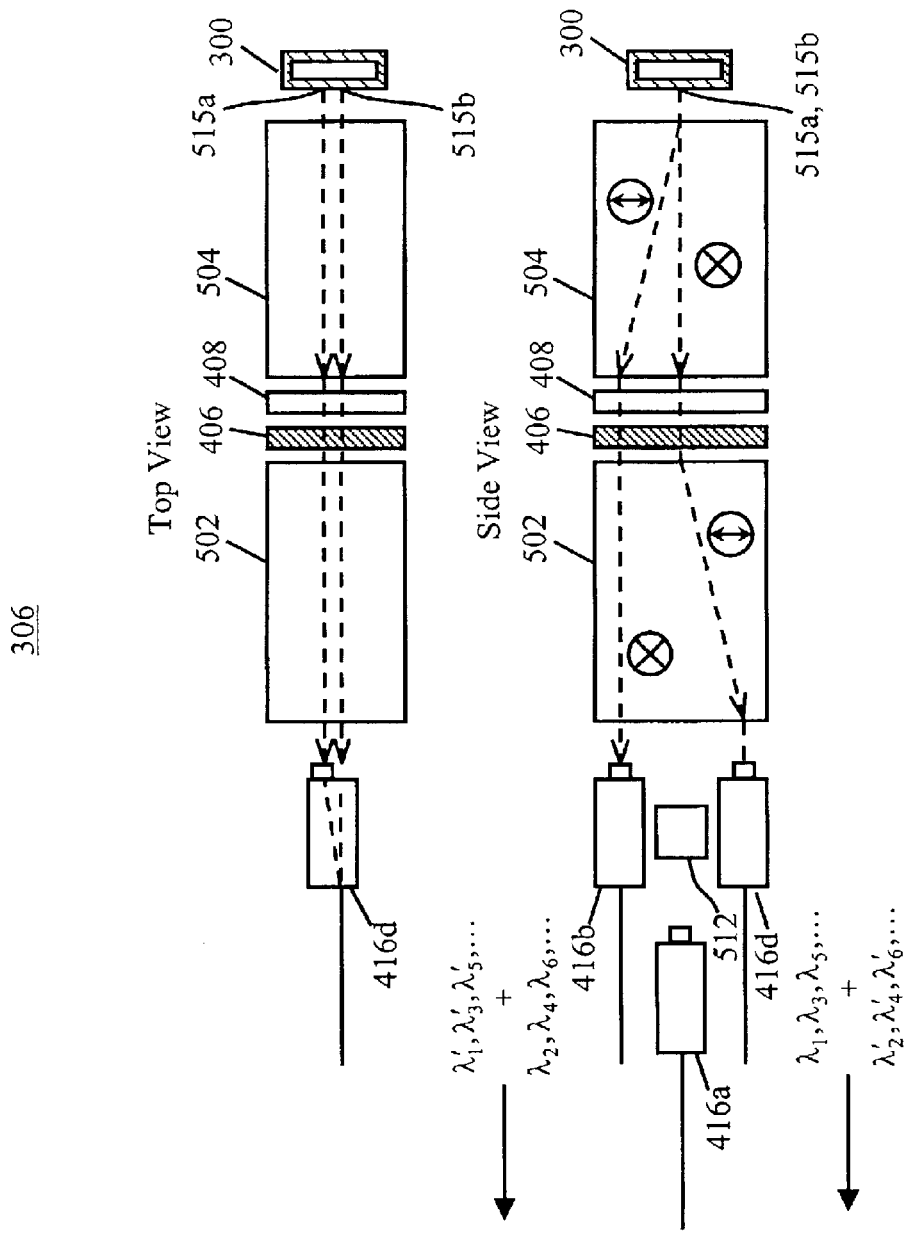

FIGS. 3E–3F are each a top view and a side view of a third 2×2 tunable and switchable interleaved channel separator apparatus that utilizes an air-density-tuned interferometer in accordance with the present invention illustrating the pathways of signal light rays therethrough. The 2×2 tunable and switchable interleaved channel separator device 306, shown in FIGS. 3E–3F is a modified version of an apparatus disclosed in U.S. Pat. No. 6,396,629 and in a co-pending U.S. patent application entitled "Switchable Interleaved Optical Channel Separator And Isolator Device And Optical Systems Utilizing Same" Ser. No. 09/792,231, filed on Feb. 23, 2001. Both of these are assigned to the assignee of the present application and are incorporated herein by reference in their entirety.

The 2×2 tunable and switchable interleaved channel separator device 306 receives first input from a first input optical port 416a and receives second input from a second input optical port 416c (top drawing of FIG. 3E). The device 306 then separates the channels received from the first optical port into a first set of channels and a second set of channels wherein the first and second sets of channels are interleaved with one another or are defined by interleaved pass bands, and separates the channels received from the second optical port into a third set of channels and a fourth set of channels, wherein the wavelengths of the third channels are the same as the wavelengths of the first channels and wherein the wavelengths of the fourth channels are the same as the wavelengths of the second channels. The first set of channels and the fourth set of channels are output to a second output optical port 416d whilst the second set channels and the third set of channels are output to a first output optical port 416b (FIG. 3F).

As shown in FIGS. 3E–3F, the 2×2 tunable and switchable interleaved channel separator device 306 comprises four optical ports 416a–416d, a polarization beam splitter (PBS) 512 optically coupled to the two input ports 416a and 416c, a first birefringent walk-off plate 502 (or, simply termed. "birefringent plate") optically coupled to the two output ports 416b and 416d and the PBS 512, a second birefringent plate 504, a non-reciprocal optical rotator 406 and a reciprocal optical rotator 408 disposed between and optically coupled to the first and second birefringent plates, and an air-density-tuned non-linear interferometer 300 optically coupled to the second birefringent plate 504.

All four ports 416a–416d comprising the 2×2 tunable and switchable interleaved channel separator device 306 are polarizing ports of the type illustrated in FIG. 6. The first input port 416a, PBS 512, first birefringent plate 502, second birefringent plate 504, first non-reciprocal optical rotator 406, first reciprocal optical rotator 408 and air-density-tuned non-linear interferometer 300 are disposed along a line which defines a main axis or dimension of the 2×2 tunable and switchable interleaved channel separator device 306. The second input port 416c is at an angle to this axis (FIG. 3E). The first output port 416b and the second output port 416d are disposed to either side of the input port 416a and are optically coupled to the first birefringent plate 502. The pair of optical rotators 406–408 does not rotate the polarization plane of light passing therethrough from left to right but does rotate, by 90°, the polarization plane of light passing therethrough from right to left.

The PBS 512 receives p-polarized optical input from the first input port 416a and receives s-polarized light from the second input port 416c (FIG. 3E). The signals delivered to the apparatus 306 from the first 416a and the second 416c input port have mutually perpendicular linear polarizations and are combined by the PBS 512. The combined signals then pass from the PBS 512 into the first birefringent plate 502.

The two birefringent plates 502–504 (FIGS. 3E–3F) each have the property of transmitting signal light comprising a first polarization (o-ray) therethrough substantially parallel to the main axis whilst simultaneously causing a deflection or offset of a signal light comprising a second polarization (e-ray). The path of the e-ray is deflected within either birefringent plate but is substantially parallel to (thereby offset from) that of the o-ray immediately upon exiting the plate. The optical axes of the two birefringent plates 502–504 are disposed such that, for e-rays passing through both such birefringent plates in a same direction, the offset of the e-ray immediately caused by passage through the second such birefringent plate is equal and opposite to the offset of the e-ray immediately caused by the passage through the first birefringent plate. As oriented in FIGS. 3E–3F, the e-rays and α-rays are polarized vertically and horizontally, respectively, during their traverses through the birefringent plates 502–504.

The pathways and polarization orientations of signal rays are shown in both top view (top diagram of each figure) and side view (lower diagram of each figure) in FIGS. 3E–3F. The complete set of two input beams, as separated by either the first 416a or the second 416c input port, is only visible in the top view of each figure. The light of a first WDM composite optical signal, which, for illustration purposes only, is assumed to be comprised of a plurality of wavelength division multiplexed channels $\lambda_1$–$\lambda_n$, is input to the PBS 512 from the first input port 416a (FIG. 3E) such that the two separated input beams both comprise p-polarized light with respect to the PBS 512. The light of a second WDM composite optical signal, which, for illustration purposes only, is assumed to be comprised of a plurality of wavelength division multiplexed channels $\lambda'_1$–$\lambda'_n$, is input to the PBS 512 from the second input port 416c (FIG. 3E) such that the two separated input beams both comprise s-polarized light with respect to the PBS 512. The p-polarized channels $\lambda_1$–$\lambda_n$ are transmitted directly through the PBS 512 and the s-polarized channels $\lambda'_1$–$\lambda'_n$ are reflected within the PBS 512 such that these two sets of channels are spatially combined.

After being spatially combined by the PBS 512, the channels $\lambda_1$–$\lambda_n$ and the channels $\lambda'_1$–$\lambda'_n$ enter the first birefringent plate 502. The horizontally polarized channels $\lambda_1$–$\lambda_n$ comprise undeflected o-rays and the vertically polarized channels $\lambda'_1$–$\lambda'_n$ comprise deflected e-rays within the first birefringent plate 502 (FIG. 3E). After emerging from the first birefringent plate 502, channels $\lambda_1$–$\lambda_n$ pass through the non-reciprocal optical rotator 406, the reciprocal optical rotator 408 and the second birefringent plate 504. The elements 406–408 are disposed such that light passing through both from left to right does not experience polarization plane rotation. Thus, the channels $\lambda_1$–$\lambda_n$ and $\lambda'_1$–$\lambda'_n$ respectively propagate through the second birefringent plate 504 as an undeflected o-ray and as a deflected e-ray (FIG. 3E).

The $\lambda_1$–$\lambda_n$ and $\lambda'_1$–$\lambda'_n$ channels all arrive at the points 515a–515b on the air-density-tuned non-linear interferometer 300. The air-density-tuned non-linear interferometer 300 operates similarly to those utilized in the 2×2 tunable and switchable interleaved channel separators 302 (FIG. 3B) and 304 (FIGS. 3C–3D) and causes polarization rotation of linearly polarized light of the second set of channels and the fourth set of channels upon reflection therefrom while leaving the polarization orientation of linearly polarized light of the first and third sets of channels unchanged.

FIG. 3F illustrates the return pathways of the first set of channels and the identical return pathways of the fourth set of channels through the 2×2 tunable and switchable interleaved channel separator 306. FIG. 3F farther illustrates the return pathways of the second set of channels and the identical return pathways of the third set of channels through the 2×2 tunable and switchable interleaved channel separator 306. The term "return pathway" herein refers to the pathway of a channel after its reflection from and interaction with the air-density-tuned non-linear interferometer 300. In these examples, it is assumed that the first channels comprise the odd channels $\lambda_1$, $\lambda_3$, $\lambda_5$ . . . , that the second channels comprise the even channels $\lambda_2$, $\lambda_4$, $\lambda_6$ . . . , that the third channels comprise another set of odd channels $\lambda'_1$, $\lambda'_3$, $\lambda'_5$ . . . and that the fourth channels comprise another set of even channels $\lambda'_2$, $\lambda'_4$, $\lambda'_6$ . . . .

As illustrated in the lower diagram of FIG. 3F, the light of the reflected first set of channels, whose polarization is not rotated by the air-density-tuned non-linear interferometer 300, remains horizontally polarized upon re-entering the second birefringent plate 504. Further, the light of the reflected fourth set of channels, whose polarization is rotated by 90° by the air-density-turned non-linear interferometer 300, is also horizontally polarized upon re-entering the second birefringent plate 504. As a result, on its return pathway, the light of the first set of channels $\lambda_1$, $\lambda_3$, $\lambda_5$ . . . and of the fourth set of channels $\lambda'_2$, $\lambda'_4$, $\lambda'_6$ . . . comprises o-rays with respect to the second birefringent plate 504 and passes directly through the birefringent plate 504 without deflection towards the reciprocal optical rotator 408 and non-reciprocal optical rotator 406. Simultaneously, the light of the reflected second set of channels $\lambda'_1$, $\lambda'_3$, $\lambda'_5$ . . . whose polarization plane is rotated by 90° upon reflection from air-density-tuned non-linear interferometer 300, and the light of the reflected third set of channels $\lambda'_1$, $\lambda'_3$, $\lambda'_5$ . . . , whose polarization is not rotated upon reflection from air-density-tuned non-linear interferometer 300, comprise e-rays with respect to the second birefringent plate 504 and are therefore deflected along their return pathway within the second birefringent plate 504.

During passage from right-to-left through the pair of elements 406–408, the polarization plane orientation of light is rotated by 90°. Because of this rotation, the light of the first set of channels and of the fourth set of channels thus becomes polarized as c-rays within the first birefringent plate 502 and the light of the second set of channels and of the third set of channels becomes polarized as o-rays within the first birefringent plate 502 (FIG. 3F). The first birefringent plate 502 therefore deflects the light comprising the first and fourth sets of channels but allows the light comprising the second and third sets of channels to pass directly therethrough without deflection. The optic axes of the two birefringent plates 502–504 are symmetrically oriented with respect to one another about a vertical plane perpendicular to the axis of device 306. Because of this disposition of the two optic axes, the offsets of channels polarized as e-rays in birefringent plate 502 and of channels polarized as e-rays in birefringent plate 504 are opposite to one another as illustrated by comparison of the pathways shown in the lower diagram of FIG. 3F.

Subsequent to passing through the birefringent plate 502 in the return direction, the first and fourth sets of channels are directed to the second output port 416d and the second and third sets of channels are directed to the first output port 416b (FIG. 3F). As described previously, since each port is a polarizing port, the two physically separate beams comprising each channel are recombined by each respective output port and focused into the respective fiber of the port. The second output port 416d (first output port 416b) is disposed so as to only receive vertically (horizontally) polarized light and thus receives the vertically (horizontally) polarized light of the first and fourth (second and third) sets of channels upon exit of this light from the birefringent plate 502. In this fashion the apparatus 306 behaves as a 2×2 interleaved channel separator. The tuning and switching capability arises from the adjustment capability of the air-density-tuned non-linear interferometer 300 as previously described.

Figure 4A:
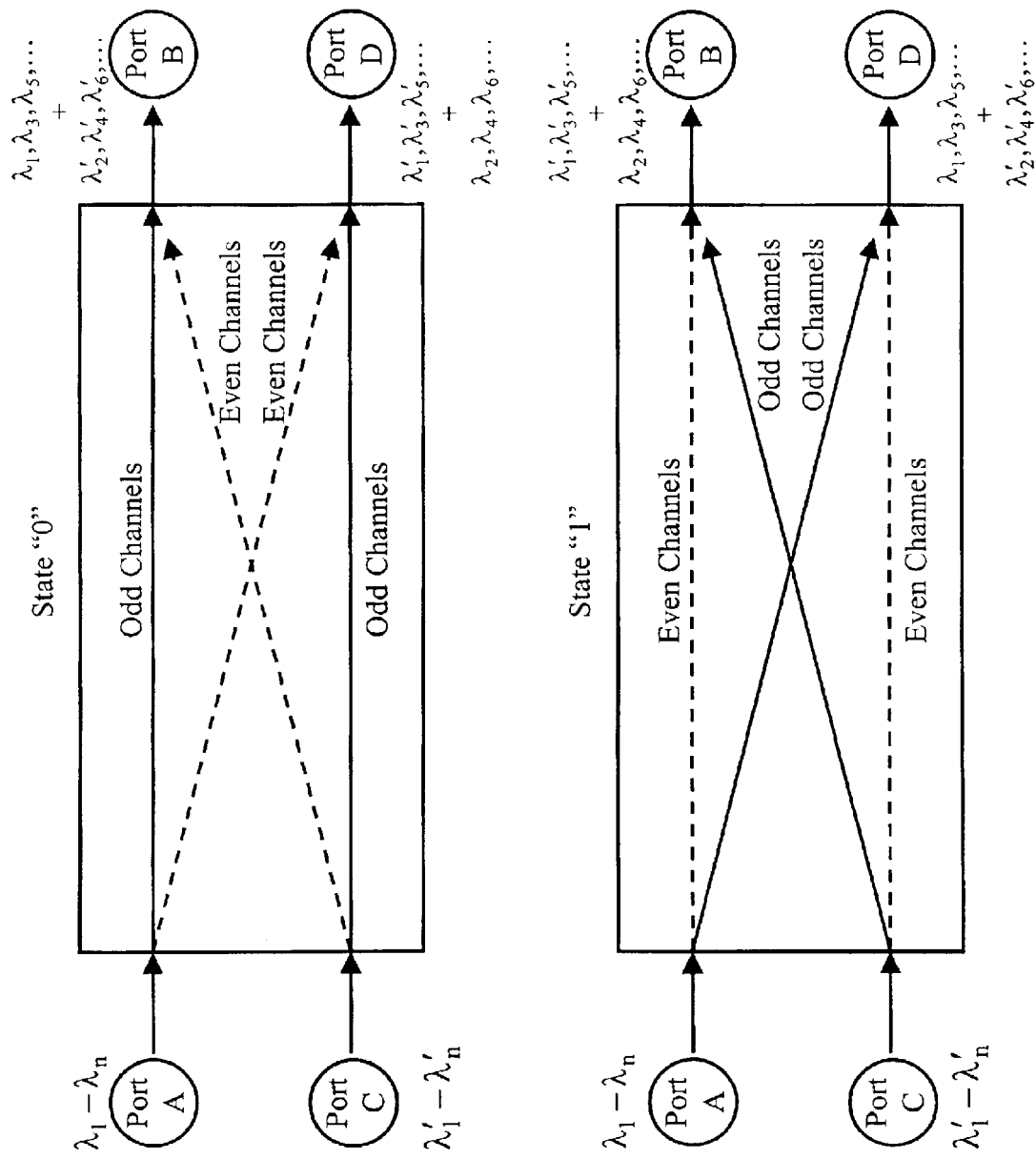
FIG. 4A is a functional signal routing diagram of two different switch states of a 2×2 tunable and switchable interleaved channel separator device.
Figure 4B:
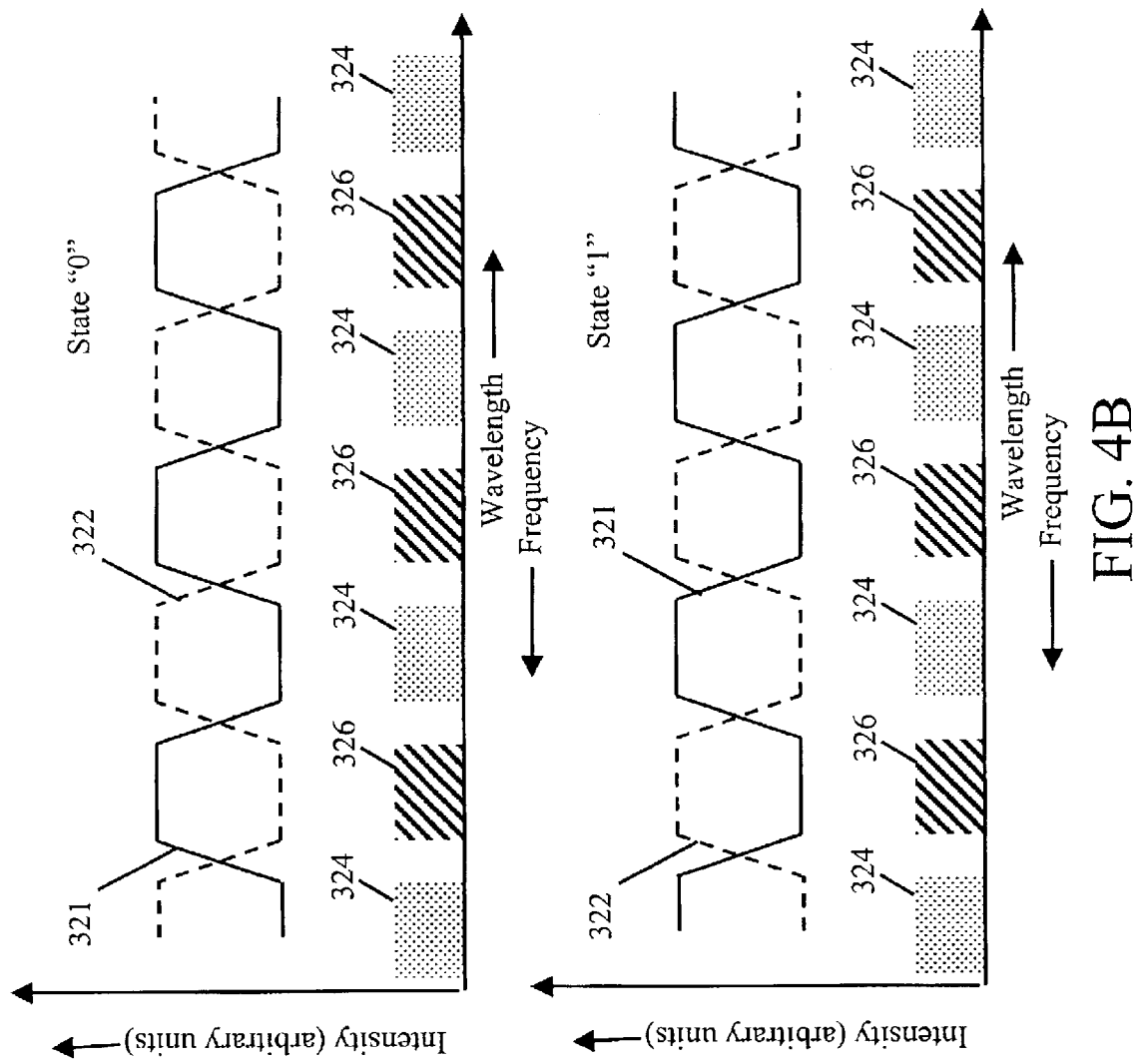
FIG. 4B is a pair of schematic graphs of the spectrum of the polarization-rotated light and the spectrum of polarization-non-rotated light reflected from an air-density-tuned non-linear interferometer in accordance with the present invention in two different operational states.

FIG. 4A is a functional signal routing diagram of two different switch states of a 2×2 tunable and switchable-interleaved channel separator device, which may comprise any of the devices 302–306. In the first switch state "0", odd-channel signals input to the switchable interleaved channel separator device from Port A and from Port C are directed to Port B and to Port D, respectively, whereas even channel signals input to the tunable and switchable interleaved channel separator device from Port A and from Port C are directed to Port D and to Port B, respectively. For instance, as shown in the upper diagram of FIG. 4A, in the state "0" the output at Port B consists of the odd channels ($\lambda_1$, $\lambda_3$, $\lambda_5$ . . . ) from the first composite optical signal $\lambda_1$–$\lambda_n$ input at Port A plus the even channels ($\lambda'_2$, $\lambda'_4$, $\lambda'_6$ . . . ) from the second composite optical signal $\lambda'_1$–$\lambda'_n$ input at Port C. Further, in the state "0", the output at Port D consists of the odd channels ($\lambda'_1$, $\lambda'_3$$\lambda'_5$ . . . ) from the second composite optical signal plus the even channels ($\lambda_2$, $\lambda_4$, $\lambda_6$ . . . ) from the first composite optical signal. In the state "1", the pathways of the odd channels and the even channels are reversed from those in the state "0" as shown in the lower diagram of FIG. 4A.

The principle that permits the change of operational states of the 2×2 tunable and switchable interleaved channel separators 302–306 is illustrated in FIG. 4B, which presents two schematic graphs of the spectrum 321 of pass bands of the polarization-rotated light and the spectrum 322 of pass bands of non-polarization-rotated light. The upper and lower graphs of FIG. 4B represent the spectra of pass bands reflected from an air-density-tuned non-linear interferometer in a first operational state "0" and in a second operational state "1", respectively. The locations of "odd" channels 324 and of "even" channels 326 are also shown in the graphs of FIG. 4B. As previously discussed, tuning of the air-density-tuned interferometers comprising the channel separator causes the spectra 321–322 of pass bands effectively "shift" to either the left or the right accordingly. A very slight change in the pass band widths also accompanies this shift, but this effect is negligible in regards to the operation of any of the air-density-tuned non-linear interferometers 302–306. The effect of the shift of the spectra of pass bands is to cause the spectrum 321 of pass bands of polarization rotated light to either coincide with the locations of the even channels 326 or the odd channels 324, depending upon the selected operational state, as may be seen be comparing the two graphs of FIG. 4B.

Figure 4C:
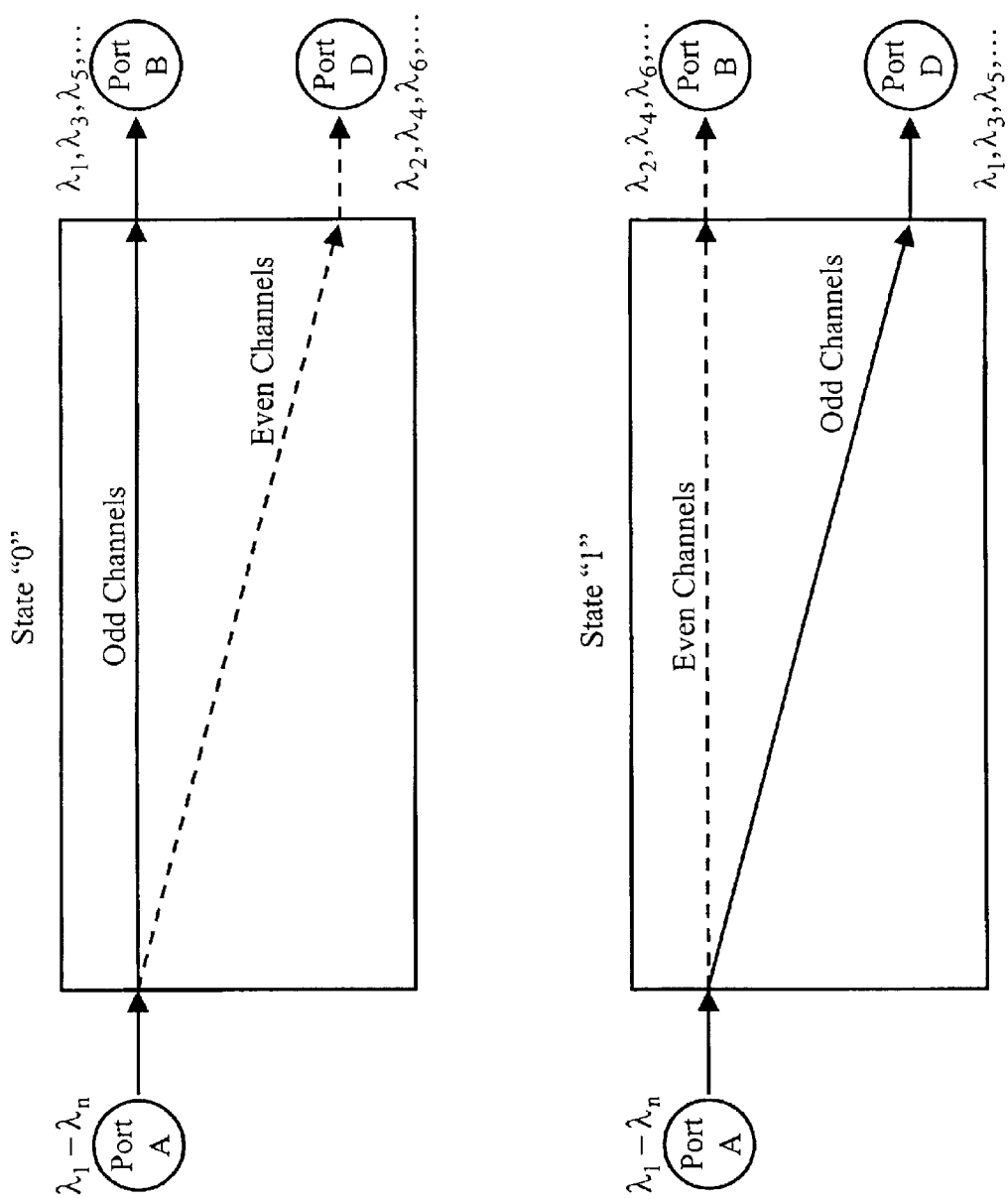
FIG. 4C is an alternative functional signal routing diagram of two different switch states of a tunable and switchable interleaved channel separator device.
Figure 4D:
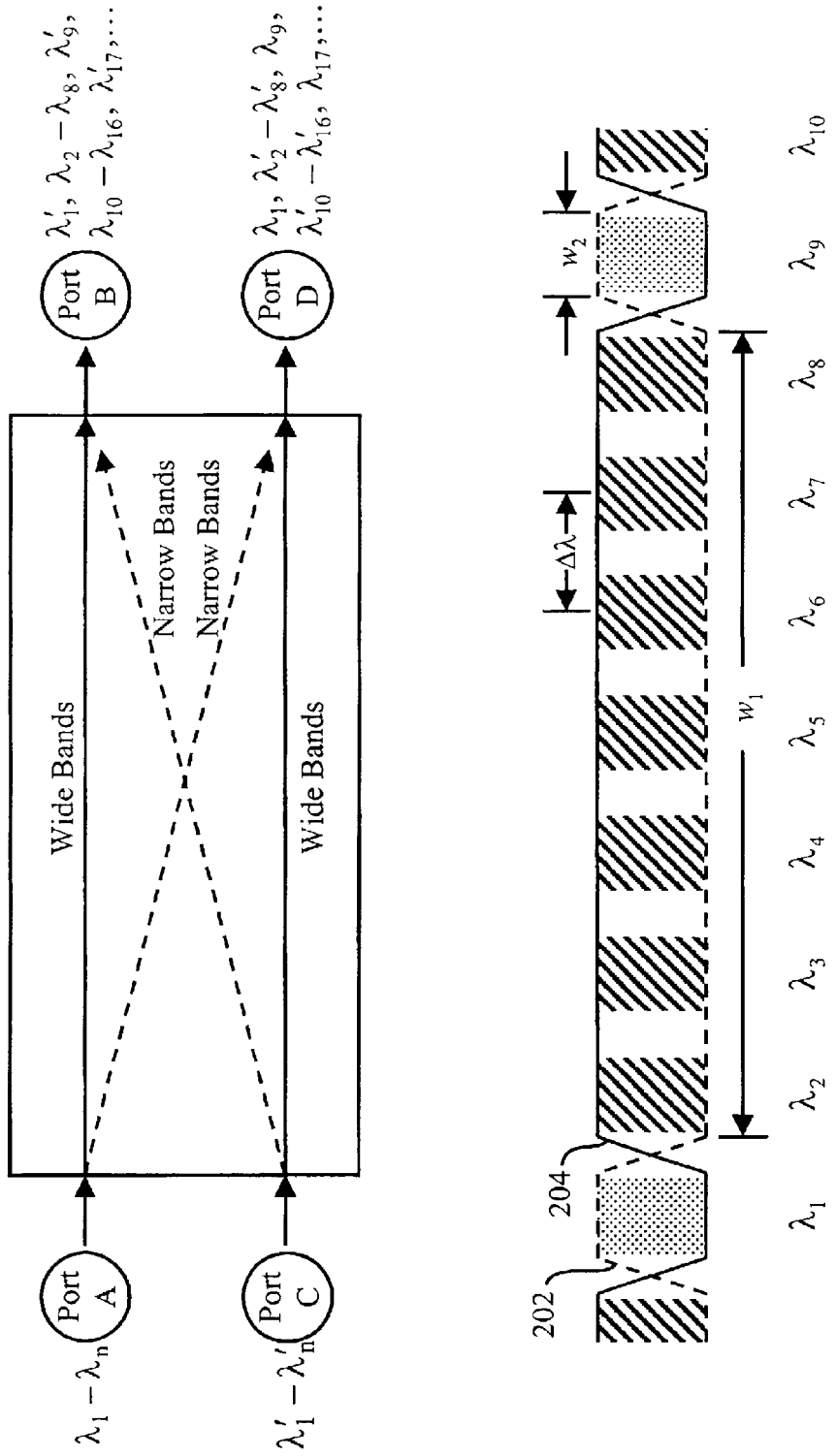
FIG. 4D is a functional signal routing diagram of a tunable and switchable interleaved channel separator device utilizing asymmetric channel separation.

FIG. 4C is an alternative functional signal routing diagram of a tunable and switchable interleaved channel separator device. In this alternative routing scheme, the apparatus only comprises one input port (Port A). In the state "0", the switchable interleaved channel separator device directs odd charnels to Port B and even channels to Port D. In the state "1", the odd channels are directed to Port D and the even channels are directed to Port B.

FIG. 4D is an alternative functional signal routing diagram of a tunable and switchable interleaved channel separator device. In this alternative routing scheme, channels input at either Port A or Port C are asymmetrically separated into two sets of bands shown in the lower drawing of FIG. 4D. The input channels are thus divided into a set 202 of narrow bands and a set 204 of wide bands that is interleaved with the set of narrow bands. The set of wide bands from Port A is then combined with the set of narrow bands from Port C since these combined sets are both routed to Port B as shown in the upper diagram of FIG. 4D. Further, the set of wide bands from Port C is combined with the set of narrow bands from Port A to be output together at Port D.

This separation of a composite optical signal into a first set of channels defined by a set of first band widths and into a second set of channels defined by a second set of band widths different from the first band widths is herein referred to as asymmetric interleaved channel separation. The relation between the band widths $w_1$ and $w_2$ is controlled by the retardance of the waveplates and the reflectance of the front mirror of an air-density-tuned non-linear interferometer (FIG. 3A) as is disclosed in U.S. Pat. No. 6,310,690. This patent is assigned to the assignee of the present application and is incorporated herein by reference in its entirety. The positions of the channels encompassed by the narrow bands and by the wide bands are indicated by stippled patterns and striped patterns, respectively, in the lowermost diagram of FIGS. 4D.

In the particular switch state shown in FIG. 4D, the signal channels denoted in stippled patterns are directed, in logical crosswise fashion, from Port A to Port D and from Port C to Port B within a 2×2 tunable and switchable interleaved channel separator. The signal channels denoted in striped patterns in FIG. 4D are directed from Port A to Port B and from Port C to Port D. The output at either Port B or Port D comprises the collection of channels routed from both Port A and Port C. For instance, as shown in the upper diagram of FIG. 4D, the output at Port B consists of the channels ($\lambda_2$–$\lambda_8$, $\lambda_{10}$–$\lambda_{16}$, $\lambda_{18}$–$\lambda_{24}$ . . . ) from the first composite optical signal $\lambda_1$–$\lambda_n$ input at Port A plus the channels ($\lambda_1'$, $\lambda_9'$, $\lambda_{17}'$ . . . ) from the second composite optical signal $\lambda_1'$–$\lambda_n'$ input at Port C. The output at Port D consists of the channels ($\lambda_1$, $\lambda_9$, $\lambda_{17}$ . . . ) from the first composite optical signal plus the channels ($\lambda'_2$–$\lambda'_8$, $\lambda'_{10}$–$\lambda'_{16}$, $\lambda'_{18}$–$\lambda'_{24}$ . . . ) from the second composite optical signal.

The exact pressure within the constant volume enclosure 184 comprising an air-density-tuned interferometer may be varied and controlled by the pressure-changing device 186. Examples of preferred pressure-changing devices are illustrated in FIGS. 5A–5C. FIG. 5A illustrates a first pressure-changing device 186.1 comprising a gas inlet tube 187 coupled to a gas reservoir or pump 189. Gas may be either forced or pumped from the gas reservoir or pump 189 into the interior of the enclosure 184 through the gas inlet tube so as to increase the density of gas within the enclosure 184. Alternatively, gas may be withdrawn from the enclosure 184 through either the inlet tube 187 or through an auxiliary outlet tube (not shown) so as to decrease the density of gas within the enclosure 184. Increasing air density increases the refractive index and decreasing air density decreases the refractive index of air within the enclosure 184.

FIG. 5B illustrates a second pressure-changing device 186.2 comprising a plunger 194 disposed within a feed-through 192. The plunger 194 forms a gas-tight seal with the feed-through so that air or gas cannot enter into or escape from the interior of the enclosure 184. The mass of gas within the enclosure 184 therefore remains constant. However, the plunger 194 is free to slide within the feed-through 192 either closer to or further from the interior of the enclosure 184. This sliding of the plunger directly changes the density of gas within the enclosure 184 by either compressing the gas or allowing the gas to expand.

FIG. 5C illustrates a third pressure-changing device 186.3 that is suitable for use in situations in which only small refractive index adjustments are required. The device 186.3 comprises a plunger 198 that is disposed outside of the enclosure 184 and a flexible membrane portion 196 of the enclosure. Preferably, the membrane portion 196 comprises a thinned portion of the wall of the enclosure 184. Alternatively, the membrane portion 196 may comprise a separate membrane affixed over a hole in the enclosure wall with a gas-tight seal. The plunger 198 either depresses or retracts from the flexible membrane portion 196. The membrane portion 196 is flexed into the interior of the enclosure 184 when the plunger 198 is pushed against it, thereby slightly decreasing the gas volume and slightly increasing the pressure, density and refractive index of the constant mass of air or gas within the enclosure. When the plunger 198 is withdrawn, the membrane portion 196 may flex outward so as to equilibrate the pressure inside and outside of the enclosure 184. This outward flexing decreases the pressure, density and refractive index of the air or gas within the enclosure 184. Preferably, air or gas cannot enter into or escape from the interior of the enclosure 184 through the membrane portion 196.

An improved tunable interferometer apparatus and methods and systems utilizing said apparatus in fiber optic communications networks have been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An air-density-tuned interferometer, comprising:
a hermetically sealed enclosure;
a front window coupled to the hermetically sealed enclosure;
an interferometer residing within the hermetically sealed enclosure, wherein the interferometer comprises:
a first glass plate optically coupled to the front window;
a first reflective coating coupled to the first glass plate;
a second reflective coating optically coupled to the first reflective coating;
a second glass plate coupled to the second reflective coating; and
a plurality of spacers coupled to the first and second glass plates, forming an optical interometric cavity therein; and
a pressure changing device coupled to the hermetically sealed enclosure for manipulating a gas pressure within the optical interferometric cavity.

2. The interferometer of claim 1, wherein the first reflective coating is partially reflective and the second reflective coating is approximately 100% reflective.

3. The interferometer of claim 2, wherein the interferometer residing within the hermetically sealed enclosure functions as a Gires-Tournois interferometer.

4. The interferometer of claim 1, further comprising:
a rear window coupled to the hermetically sealed enclosure and optically coupled to the second glass plate.

5. The interferometer of claim 4, wherein the first and the second reflective coatings are partially reflective.

6. The interferometer of claim 4, wherein the interferometer residing within the hermetically sealed enclosure functions as a Fabry-Perot interferometer.

7. The interferometer of claim 1, further comprising:
a first birefringent waveplate optically coupled between the front window and the first glass plate; and
a second birefringent waveplate optically coupled between the first and the second reflective coatings.

8. The interferometer of claim 7, wherein the first reflective coating is partially reflective and the second reflective coating is approximately 100% reflective.

9. The interferometer of claim 7, wherein the interferometer residing within the hermetically sealed enclosure functions as a non-linear interferometer.

10. The interferometer of claim 1, wherein the pressure changing device comprises:
a gas inlet tube coupled to the hermetically sealed enclosure; and
a gas reservoir pump coupled to the gas inlet tube.

11. The interferometer of claim 1, wherein the pressure changing device comprises:
a feed-through coupled to the hermetically sealed enclosure; and
a plunger residing within the feed-through.

12. The interferometer of claim 1, wherein the pressure changing device comprises:
a flexible membrane portion coupled to the hermetically sealed enclosure; and
a plunger abutting the flexible membrane portion.

13. An air-density-tuned interferometer, comprising:
a hermetically sealed enclosure;
a front window coupled to the hermetically sealed enclosure;
an interferometer residing within the hermetically sealed enclosure, wherein the interferometer comprises:
a first glass plate optically coupled to the front window;
a partially reflective coating coupled to the first glass plate;
an approximately 100% reflective coating optically coupled to the partially reflective coating;
a second glass plate coupled to the approximately 100% reflective coating; and
a plurality of spacers coupled to the first and second glass plates, forming an optical interometric cavity therein; and
a pressure changing device coupled to the hermetically sealed enclosure for manipulating a gas pressure within the optical interferometric cavity.

14. An air-density-tuned interferometer, comprising:
a hermetically sealed enclosure;
a front window coupled to the hermetically sealed enclosure;
an interferometer residing within the hermetically sealed enclosure, wherein the interferometer comprises:
a first glass plate optically coupled to the front window;
a first partially reflective coating coupled to the first glass plate;
a second partially reflective coating optically coupled to the first partially reflective coating;
a second glass plate coupled to the second reflective coating; and
a plurality of spacers coupled to the first and second glass plates, forming an optical interometric cavity therein;
a rear window coupled to the hermetically sealed enclosure and optically coupled to the second glass plate; and
a pressure changing device coupled to the hermetically sealed enclosure for manipulating a gas pressure within the optical interferometric cavity.

15. An air-density-tuned interferometer, comprising:
a hermetically sealed enclosure;
a front window coupled to the hermetically sealed enclosure;
an interferometer residing within the hermetically sealed enclosure, wherein the interferometer comprises:
a first glass plate optically coupled to the front window;
a partially reflective coating coupled to the first glass plate;
an approximately 100% reflective coating optically coupled to the partially reflective coating;
a second glass plate coupled to the approximately 100% reflective coating; and
a plurality of spacers coupled to the first and second glass plates, forming an optical interometric cavity therein;
a first birefringent waveplate optically coupled between the front window and the first glass plate;
a second birefringent waveplate optically coupled between the partially reflective coating and the approximately 100% reflective coating; and
a pressure changing device coupled to the hermetically sealed enclosure for manipulating a gas pressure within the optical interferometric cavity.

16. A tunable multiplexer/demultiplexer, comprising:
an input optical fiber;
at least one output fiber;
a first lens optically coupled to the input optical fiber;
a second lens optically coupled to the at least one output fiber;

a beam splitter optically coupled to the input optical fiber and the at least one output fiber;

a mirror optically coupled to the beam splitter at a side opposite to the input optical fiber; and an air-density-tuned interferometer optically coupled to the beam splitter at a side opposite to the at least one output fiber, wherein the air-density-tuned interferometer comprises:
a hermetically sealed enclosure;
a front window coupled to the hermetically sealed enclosure and optically coupled to the beam splitter;
an interferometer residing within the hermetically sealed enclosure, wherein the interferometer comprises:
a first glass plate optically coupled to the front window;
a partially reflective coating coupled to the first glass plate;
an approximately 100% reflective coating optically coupled to the partially reflective coating;
a second glass plate coupled to the approximately 100% reflective coating; and
a plurality of spacers coupled to the first and second glass plates, forming an optical interometric cavity therein; and
a pressure changing device coupled to the hermetically sealed enclosure for manipulating a gas pressure within the optical interferometric cavity.

17. A tunable chromatic dispersion compensator, comprising:
an input optical fiber;
an output optical fiber;
a collimator optically coupled to the input and output optical fibers; and
an air-density-tuned interferometer optically coupled to the collimator at a side opposite to the input and output optical fibers, wherein the air-density-tuned interferometer comprises:
a hermetically sealed enclosure;
a front window coupled to the hermetically sealed enclosure and optically coupled to the collimator;
an interferometer residing within the hermetically sealed enclosure, wherein the interferometer comprises:
a first glass plate optically coupled to the front window;
a partially reflective coating coupled to the first glass plate;
an approximately 100% reflective coating optically coupled to the partially reflective coating;
a second glass plate coupled to the second reflective coating; and
a plurality of spacers coupled to the first and second glass plates, forming an optical interometric cavity therein; and
a pressure changing device coupled to the hermetically sealed enclosure for manipulating a gas pressure within the optical interferometric cavity.

18. A system, comprising:
a plurality of tunable chromatic dispersion compensators, each tunable chromatic dispersion compensator comprising an air-density-tuned interferometers, wherein each air-density-tuned interferometer comprises a set of operational parameters, wherein each air-density-tuned interferometer comprises:
a hermetically sealed enclosure;
a front window coupled to the hermetically sealed enclosure;
an interferometer residing within the hermetically sealed enclosure, wherein the interferometer comprises:
a first glass plate optically coupled to the front window;
a partially reflective coating coupled to the first glass plate;
an approximately 100% reflective coating optically coupled to the partially reflective coating;
a second glass plate coupled to the approximately 100% reflective coating; and
a plurality of spacers coupled to the first and second glass plates, forming an optical interometric cavity therein; and
a pressure changing device coupled to the hermetically sealed enclosure for manipulating a gas pressure within the optical interferometric cavity; and
a plurality of optical couplings between the plurality of tunable chromatic dispersion compensators.

19. A tunable and switchable interleaved channel separator, comprising:
a first and a second input optical fibers;
a first and a second output optical fibers;
a first lens optically coupled to the first input optical fiber and the first output optical fiber;
a second lens optically coupled to the second input optical fiber and the second output optical fiber;
a polarization beam splitter, wherein the first lens is optically coupled to a first face of the polarization beam splitter at a side opposite to the first input and first output optical fibers, wherein the second lens is optically coupled to a second face of the polarization beam splitter at a side opposite to the second input and second output optical fibers, wherein the first face is adjacent to the second face;
a first air-density-tuned interferometer optically coupled to a third face of the polarization beam splitter opposite to the second face; and
a second air-density-tuned interferometer optically coupled to a fourth face of the polarization beam splitter opposite to the first face, wherein the first and second air-density-tuned interferometer comprises:
a hermetically sealed enclosure;
a front window coupled to the hermetically sealed enclosure;
an interferometer residing within the hermetically sealed enclosure, wherein the interferometer comprises:
a first glass plate optically coupled to the front window;
a partially reflective coating coupled to the first glass plate;
an approximately 100% reflective coating optically coupled to the partially reflective coating;
a second glass plate coupled to the approximately 100% reflective coating; and
a plurality of spacers coupled to the first and second glass plates, forming an optical interometric cavity therein;
a first birefringent waveplate optically coupled between the front window and the first glass plate;
a second birefringent waveplate optically coupled between the partially reflective coating and the approximately 100% reflective coating; and a pressure changing device coupled to the hermetically sealed enclosure for manipulating a gas pressure within the optical interferometric cavity.

20. A tunable and switchable interleaved channel separator, comprising:
- a first polarization beam splitter;
- a first set of optical rotators optically coupled to the first polarization beam splitter at a face intersecting a main axis of the separator, the first set of optical rotators comprising a first non-reciprocal optical rotator and a first reciprocal optical rotator;
- a second polarization beam splitter optically coupled to the first set of optical rotators at a side opposite to the first polarization beam splitter;
- an air-density-tuned interferometer optically coupled to the second polarization beam splitter at a side opposite to the first set of optical rotators, the air-density-tuned interferometer comprising:
  - a hermetically sealed enclosure;
  - a front window coupled to the hermetically sealed enclosure and optically coupled to the second polarization beam splitter;
  - an interferometer residing within the hermetically sealed enclosure, wherein the interferometer comprises:
    - a first glass plate optically coupled to the front window;
    - a partially reflective coating coupled to the first glass plate;
    - an approximately 100% reflective coating optically coupled to the partially reflective coating;
    - a second glass plate coupled to the approximately 100% reflective coating; and
    - a plurality of spacers coupled to the first and second glass plates, forming an optical interometric cavity therein;
  - a first birefringent waveplate optically coupled between the front window and the first glass plate;
  - a second birefringent waveplate optically coupled between the partially reflective coating and the approximately 100% reflective coating; and
  - a pressure changing device coupled to the hermetically sealed enclosure for manipulating a gas pressure within the optical interferometric cavity;
- a second set of optical rotators optically coupled to the second polarization beam splitter at a face not intersecting the main axis, the second set of optical rotators comprising a second non-reciprocal optical rotator and a second reciprocal optical rotator;
- a third polarization beam splitter optically coupled to the second set of optical rotators at a side opposite to the second polarization beam splitter; and
- an optical reflector optically coupled to a face of the first polarization beam splitter not intersecting the main axis.

21. The separator of claim 20, further comprising:
- a first input optical port optically coupled to the first polarization beam splitter at a side opposite to the first set of optical rotators;
- a second input optical port optically coupled to the third polarization beam splitter at a side opposite to the second set of optical rotators;
- a first output optical port optically coupled to the third polarization beam splitter; and
- a second output optical port optically coupled to the optical reflector.

22. The separator of claim 21, wherein the first and second input optical ports and the first and second output optical ports, each comprises:
- an optical collimator;
- a birefringent walk-off plate optically coupled to the optical collimator; and
- a reciprocal optical rotator intercepting a portion of a light traversing the birefringent walk-off plate.

23. A tunable and switchable interleaved channel separator, comprising:
- a first and a second input optical ports;
- a first and a second output optical ports;
- a polarization beam splitter optically coupled to the first and second input optical ports;
- a first birefringent walk-off plate optically coupled to the polarization beam splitter and the first and second output optical ports;
- a set of optical rotators optically coupled to the first birefringent walk-off plate at a side opposite to the polarization beam splitter, wherein the set of optical rotators comprises a reciprocal optical rotator and a non-reciprocal optical rotator;
- a second birefringent walk-off plate optically coupled to the set of optical rotators at a side opposite to the first birefringent walk-off plate; and
- an air-density-tuned interferometer optically coupled to the second birefringent walk-off plate at a side opposite to the set of optical rotators, wherein the air-density-tuned interferometer comprises:
  - a hermetically sealed enclosure;
  - a front window coupled to the hermetically sealed enclosure and optically coupled to the second birefringent walk-off plate;
  - an interferometer residing within the hermetically sealed enclosure, wherein the interferometer comprises:
    - a first glass plate optically coupled to the front window;
    - a partially reflective coating coupled to the first glass plate;
    - an approximately 100% reflective coating optically coupled to the partially reflective coating,
    - a second glass plate coupled to the approximately 100% reflective coating; and
    - a plurality of spacers coupled to the first and second glass plates, forming an optical interometric cavity therein;
  - a first birefringent waveplate optically coupled between the front window and the first glass plate;
  - a second birefringent waveplate optically coupled between the partially reflective coating and the approximately 100% reflective coating; and
  - a pressure changing device coupled to the hermetically sealed enclosure for manipulating a gas pressure within the optical interferometric cavity.

24. The separator of claim 23, wherein the first and second input optical ports and the first and second output optical ports, each comprises:
- an optical collimator;
- a third birefringent walk-off plate optically coupled to the optical collimator; and
- a reciprocal optical rotator intercepting a portion of a light traversing the third birefringent walk-off plate.

* * * * *